(12) United States Patent
Kuo et al.

(10) Patent No.: US 12,093,817 B2
(45) Date of Patent: Sep. 17, 2024

(54) ARTIFICIAL NEURAL NETWORK CONFIGURATION AND DEPLOYMENT

(71) Applicant: City University of Hong Kong, Kowloon (HK)

(72) Inventors: Tei-wei Kuo, Kowloon (HK); Antoni Bert Chan, Kowloon (HK); Chun Xue, Kowloon (HK); Yufei Cui, Kowloon (HK); Ziquan Liu, Kowloon (HK); Wuguannan Yao, Kowloon (HK); Qiao Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 779 days.

(21) Appl. No.: 17/000,612

(22) Filed: Aug. 24, 2020

(65) Prior Publication Data
US 2022/0058478 A1   Feb. 24, 2022

(51) Int. Cl.
*G06N 3/08*   (2023.01)
*G06N 3/04*   (2023.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS 10,776,668 B2 *  9/2020  Dutta ................ G06F 18/24
11,328,222 B1 *  5/2022  Matthews ........... H04L 49/3027
2018/0046916 A1 *  2/2018  Dally ................ G06F 7/523
2018/0336468 A1 * 11/2018  Kadav .............. G06V 10/454
2019/0236438 A1 *  8/2019  Odena ................ G06N 3/08
2020/0134461 A1 *  4/2020  Chai ................. G06N 3/084
2022/0067527 A1 *  3/2022  Xu .................... G06N 3/063

OTHER PUBLICATIONS

Lazarevic, Aleksandar, and Zoran, Obradovic, "Effective pruning of neural network classifier ensembles," International Joint Conference on Neural Networks. Proceedings (Cat. No. 01CH37222), vol. 2 (Jul. 2001) pp. 796-801 (Year: 2001).*
Gomez et al. (Learning Sparse Networks Using Targeted Dropout, Sep. 2019, pp. 1-14) (Year: 2019).*
Inoue (Multi-Sample Dropout for Accelerated Training and Better Generalization, May 2019, pp. 1-12) (Year: 2019).*

(Continued)

*Primary Examiner* — George Giroux
(74) *Attorney, Agent, or Firm* — Renner, Kenner, Greive, Bobak, Taylor & Weber

(57) ABSTRACT

A computer-implemented method and a system for configuring and implementing an artificial neural network. The method for configuring includes initializing an artificial neural network; and training, based on a training operation, the artificial neural network so as to form an adaptively deployable artificial neural network defining a plurality of nested artificial neural sub-networks. Each artificial neural sub-network is optimal for a respective resource configuration. The method for implementing includes determining an optimal configuration of the artificial neural network for deployment at an electrical device, and deploying the artificial neural network with the optimal configuration at the electrical device.

19 Claims, 14 Drawing Sheets

(56) References Cited

OTHER PUBLICATIONS

Yoram Baram. Nested neural networks. NASA Technical Memorandum 101032, 1988.

Han Cai, Ligeng Zhu, and Song Han. Proxylessnas: Direct neural architecture search on target task and hardware. arXiv preprint arXiv:1812.00332, 2018.

Tianqi Chen and Carlos Guestrin. Xgboost: A scalable tree boosting system. In Proceedings of the 22nd acm sigkdd International conference on knowledge discovery and data mining, pp. 785-794. ACM, 2016.

Song Han, Huizi Mao, and William Dally. Deep compression: Compressing deep neural networks with pruning, trained quantization and huffman coding. In International Conference on Learning Representations, 2016.

Trevor Hastie, Robert Tibshirani, and Jerome Friedman. The elements of statistical learning: data mining, inference, and prediction. Springer Science & Business Media, 2009.

Weiwen Jiang, Xinyi Zhang, Edwin HM Sha, Lei Yang, Qingfeng Zhuge, Yiyu Shi, and Jingtong Hu. Accuracy vs. efficiency: Achieving both through fpga-implementation aware neural architecture search. In Proceedings of the 56th Annual Design Automation Conference 2019, p. 5. ACM, 2019.

Qing Jin, Linjie Yang, and Zhenyu Liao. Adabits: Neural network quantization with adaptive bitwidths. arXiv preprint arXiv:1912.09666, 2019.

Eunwoo Kim, Chanho Ahn, and Songhwai Oh. Nestednet: Learning nested sparse structures in deep neural networks. In Proceedings of the IEEE Conference on Computer Vision and Pattern Recognition, pp. 8669-8678, 2018.

Yann LeCun, Yoshua Bengio, and Geoffrey Hinton. Deep learning. nature, 521(7553):436, 2015.

Kirill Neklyudov, Dmitry Molchanov, Arsenii Ashukha, and Dmitry P Vetrov. Structured bayesian pruning via log-normal multiplicative noise. In Advances in Neural Information Processing Systems, pp. 6775-6784, 2017.

Oren Rippel, Michael Gelbart, and Ryan Adams. Learning ordered representations with nested dropout. In International Conference on Machine Learning, pp. 1746-1754, 2014.

Mark Sandler, Andrew Howard, Menglong Zhu, Andrey Zhmoginov, and Liang-Chieh Chen. Mobilenetv2: Inverted residuals and linear bottlenecks. In Proceedings of the IEEE Conference on Computer Vision and Pattern Recognition, pp. 4510-4520, 2018.

Andreas Veit, Michael JWilber, and Serge Belongie. Residual networks behave like ensembles of relatively shallow hetworks. In Advances in neural information processing systems, pp. 550-558, 2016.

Kuan Wang, Zhijian Liu, Yujun Lin, Ji Lin, and Song Han. Haq: Hardware-aware automated quantization with mixed precision. In Proceedings of the IEEE Conference on Computer Vision and Pattern Recognition, pp. 8604-8612, 2019.

Saining Xie, Ross Girshick, Piotr Doll'ar, Zhuowen Tu, and Kaiming He. Aggregated residual transformations for deep neural networks. In Proceedings of the IEEE conference on computer vision and pattern recognition, pp. 5987-5995, 2017.

Jiwei Yang, Xu Shen, Jun Xing, Xinmei Tian, Houqiang Li, Bing Deng, Jianqiang Huang, and Xiansheng Hua. Quantization networks. In Proceedings of the IEEE Conference on Computer Vision and Pattern Recognition, pp. 7308-7316, 2019.

Jiahui Yu and Thomas S Huang. Universally slimmable networks and improved training techniques. In Proceedings of the IEEE International Conference on Computer Vision, pp. 1803-1811, 2019.

Haichao Yu, Haoxiang Li, Humphrey Shi, Thomas S Huang, and Gang Hua. Any-precision deep neural networks. arXiv preprint arXiv:1911.07346, 2019.

Jiahui Yu, Linjie Yang, Ning Xu, Jianchao Yang, and Thomas Huang. Slimmable neural networks. In International Conference on Learning Representations, 2019.

Xiangyu Zhang, Xinyu Zhou, Mengxiao Lin, and Jian Sun. Shufflenet: An extremely efficient convolutional neural network for mobile devices. In Proceedings of the IEEE Conference on Computer Vision and Pattern Recognition, pp. 6848-6856, 2018.

Shuchang Zhou, Yuxin Wu, Zekun Ni, Xinyu Zhou, He Wen, and Yuheng Zou. Dorefa-net: Training low bitwidth convolutional neural networks with low bitwidth gradients. CoRR, abs/1606.06160, 2016.

Zhi-Hua Zhou. Ensemble methods: foundations and algorithms. Chapman and Hall/CRC, 2012.

\* cited by examiner

Algorithm 1 Heuristic search algorithm

Input: A trained $FN^3$; candidate number $C$; block number per layer $\{M_l\}_l$; $t_{j_k}$; $\Delta p$; $\mathcal{P} = 100\% - \Delta p$; $\mathcal{T} = \{(t_{j_k})\}_{k=1}^K$; $t_{j_k} = \emptyset$; pool $= \emptyset$; $\mathcal{W} = \{(i', j')\}$.

1: while $\mathcal{W} \neq \emptyset$ do
2:   for $k = 1$ to $K$ do
3:     for $c = 1$ to $C$ do
4:       sample a new candidate $(i^*, j^*)$ from $\mathcal{W}$.
5:       pool $=$ pool $\cup \{t_{j_k} \cup (i^*, j^*)\}$.
6:     end for
7:   end for
8:   Evaluate acc. of tj $\in$ pool and select top-K $\{t_{j_k}^*\}_{k=1}^K$.
9:   $\mathcal{T} = \{t_{j_k}^*\}_{k=1}^K$;
10:   $\mathcal{W} = \mathcal{W} \setminus (\mathcal{W} \cup \mathcal{T})$.
11:   while $\exists A \in \mathcal{W} > (\mathcal{P} + \Delta p) M_l$ and $\mathcal{P} \neq 0$ do
12:     $\mathcal{P} = \mathcal{P} - \Delta p$; Move $\mathcal{W}$ by $\Delta p$.
13:   end while
14:   pool $= \emptyset$.
15: end while

Figure 4

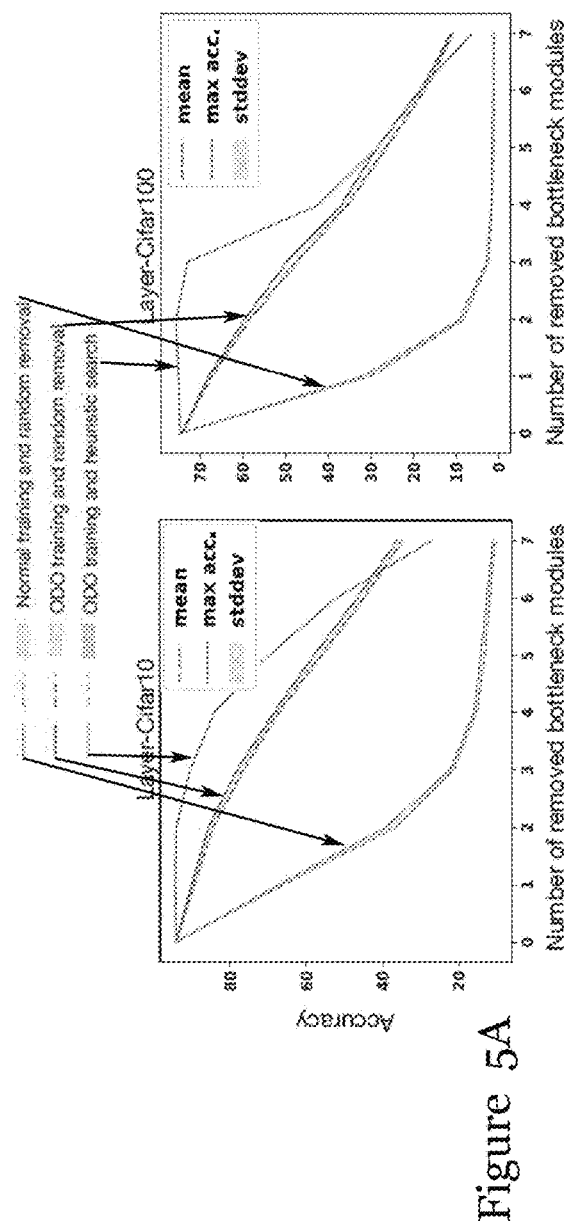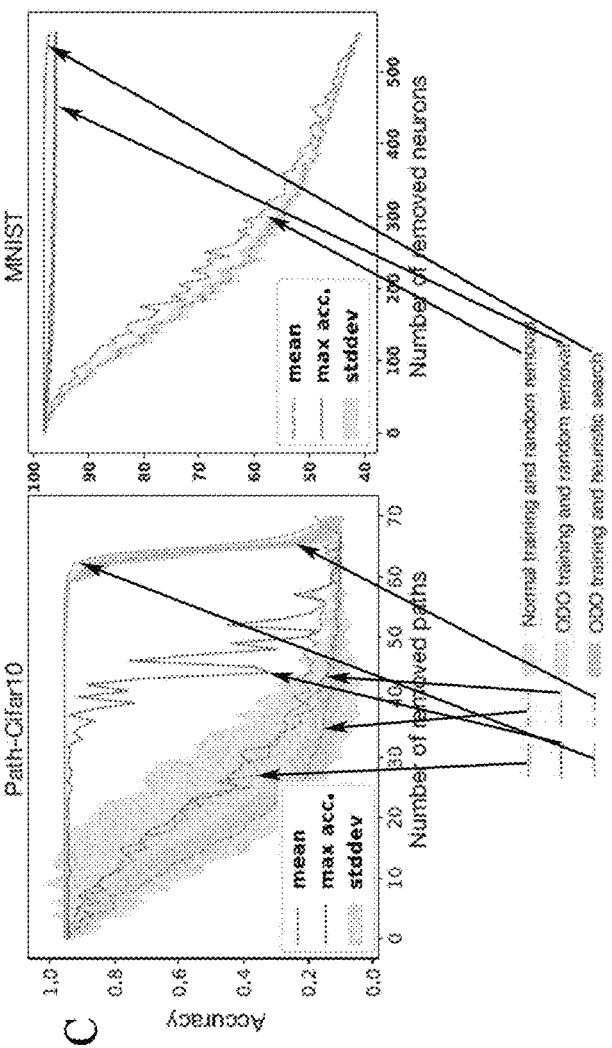
Figure 5A  Figure 5B
Figure 5C  Figure 5D

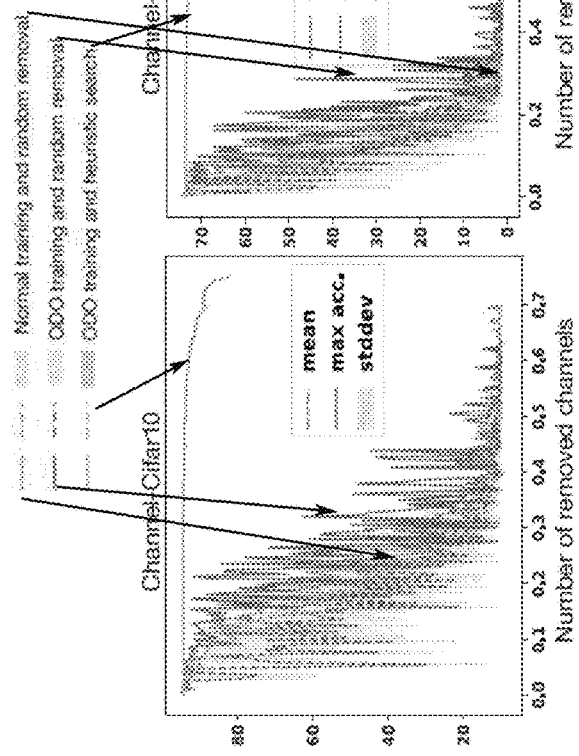
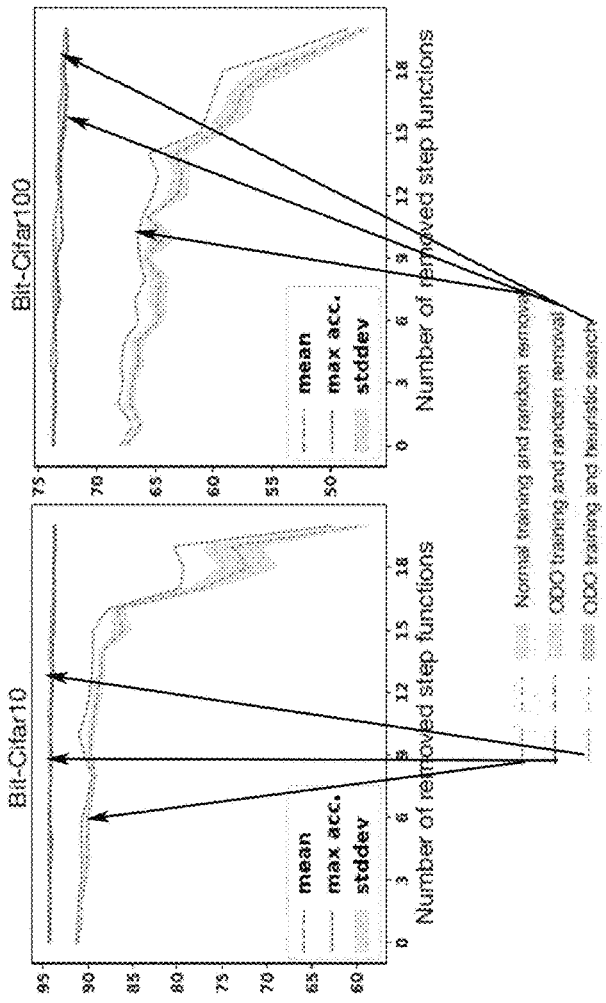
Figure 5E Figure 5F Figure 5G Figure 5H

ARTIFICIAL NEURAL NETWORK CONFIGURATION AND DEPLOYMENT

TECHNICAL FIELD

The invention relates generally to configuring and deploying an artificial neural network.

BACKGROUND

Artificial neural networks are one of the most important tools used in machine learning, as they can mimic a human brain to learn and extract useful information from input data and information. Some exemplary applications of artificial neural networks include deep neural networks used in various domains such as computer vision, natural language processing, etc.

Depending on the complexity of the application, artificial neural networks may require significant computing resources, power, and/or time to operate. This may often lead to ineffective operation which is undesirable.

Various methods have been proposed to incorporate computation-intensive (e.g., processing- and/or memory-intensive) neural networks into computing devices (such as mobile devices) and embedded hardware, in particular ones that have limited resources. Some exemplary methods include developing light-weight neural network architecture to relax the requirement on computing resources, compressing a pre-trained neural network through pruning, etc. Another method to incorporate a neural network into a resource-limited device is quantization, which quantizes full-precision weights into a small number of bits. While search-based methods can be applied in these cases to determine the optimal setup, and potentially to alleviate the need to manually tune hyper-parameter, the algorithms in these methods would have to be re-run once the resource configuration or budget (e.g., CPU clock rate, number of cores, size of RAM, etc.) changes.

To this end, some approaches have been developed to train a neural network that is adaptive to different resource configurations or budgets. One such approach specifically designed for adaptive channel numbers is disclosed in Yu et. al. *Slimmable neural networks. International Conference on Learning Representations,* 2019. Another such approach specifically designed for adaptive quantization bits is disclosed in Jin et. al. *Neural network quantization with adaptive bitwidths. arXiv preprint arXiv:*1912.09666, 2019. In these approaches, as changing the channel numbers or bit-widths would lead to inconsistent batch normalization statistics, heuristics like maintaining multiple sets of switchable batch normalization parameters are used. This results in a quadratic number of batch normalization parameters with respect to the number of channels/bits is required to be updated, which substantially limits the flexibility of the neural network.

SUMMARY OF THE INVENTION

In a first aspect of the invention, there is provided a computer-implemented method of configuring an artificial neural network. The method includes initializing an artificial neural network; and training, based on a training operation (using training data), the artificial neural network so as to form an adaptively deployable artificial neural network that defines a plurality of nested artificial neural sub-networks. Each artificial neural sub-network is optimal for a respective resource configuration. The artificial neural network may include a plurality of additive building blocks each defined by a respective basis function. The artificial neural network may include one or more layers each with a plurality of additive building blocks each defined by a respective basis function. The artificial neural network may be a deep neural network. The artificial neural network may be a convolutional neural network. The artificial neural sub-networks are nested in such a way that a smaller artificial neural sub-network forms the basis of a larger artificial neural sub-network.

In one embodiment of the first aspect, the training operation includes randomly selecting nested sub-networks during training batches.

In one embodiment of the first aspect, the training operation includes ranking the building blocks based on a level of importance of the respective building blocks.

In one embodiment of the first aspect, the training operation includes assigning each of the building blocks with a respective block index taken from a distribution of block indices. The training operation may also include, for each iteration: selecting a building block or a block index from the distribution of block indices; dropping all building blocks with block indices greater than the selected building block or the selected block index; and performing training on the remaining building blocks. The selecting may be a random selection. The distribution may be a categorical distribution or a geometric distribution. The dropping may alternatively be dropping all building blocks with block indices greater than or equal to the selected building block or the selected block index. In an embodiment in which the neural network includes multiple layers, the distribution (e.g., the categorical distribution or the geometric distribution) for different layers may be independent. The block indices of the building blocks may be different (e.g., each building block has a unique block index). Alternatively, the block indices of some of the building blocks may be the same.

In one embodiment of the first aspect, the training operation can be selectively applied to different levels of the artificial neural network. These levels include bit-level, neuron-level, channel-level, path-level, and layer-level.

In one embodiment of the first aspect, the building blocks are quantization functions associated with quantization bits. The quantization functions may include different Heaviside step functions. A sum of the Heaviside step functions corresponds to a weighted sum of the quantization bits, which corresponds to quantization values.

In one embodiment of the first aspect, the building blocks are weights of a dense layer. A weighted sum of the inputs (weighted according to the weights) forms an output of the dense layer.

In one embodiment of the first aspect, the building blocks are input channels of a convolution layer. A weighted sum of outputs of the channels forms a pixel in an output feature map of the convolution layer.

In one embodiment of the first aspect, the building blocks are residual paths or blocks in ResNeXt. A sum of outputs of the residual paths or blocks forms an output.

In one embodiment of the first aspect, the building blocks are paths in a convolution neural network with multiple layers and residual connections. A sum of outputs of the paths forms an output.

In a second aspect of the invention, there is provided an artificial neural network that includes a plurality of nested artificial neural sub-networks each being optimal for a respective resource configuration. The artificial neural network may be formed based on/using the method of the first aspect.

In a third aspect of the invention, there is provided an electrical device storing and/or operating an artificial neural network of the second aspect. The electrical device may be an information/data handling system. The electrical device can be of any type and form, e.g., a desktop computer, a laptop computer, a tablet computer, a smart phone, a smart watch, an IoT device, an autonomous or smart vehicle, video surveillance device, a smart home control device, etc.

In a fourth aspect of the invention, there is provided a system for configuring an artificial neural network. The system includes one or more processors configured to: initialize an artificial neural network; and train, based on a training operation (using training data), the artificial neural network so as to form an adaptively deployable artificial neural network defining a plurality of nested artificial neural sub-networks. Each of the artificial neural sub-network is optimal for a respective resource configuration. The artificial neural network may include a plurality of additive building blocks each defined by a respective basis function. The artificial neural network may include one or more layers each with a plurality of additive building blocks each defined by a respective basis function. The artificial neural network may be a deep neural network. The artificial neural network may be a convolutional neural network. The artificial neural sub-networks are nested in such a way that a smaller artificial neural sub-network forms the basis of a larger artificial neural sub-network.

In one embodiment of the fourth aspect, the one or more processors are configured to perform the training operation.

In one embodiment of the fourth aspect, the training operation includes randomly selecting nested sub-networks during training batches.

In one embodiment of the fourth aspect, the training operation includes ranking the building blocks based on a level of importance of the respective building blocks.

In one embodiment of the fourth aspect, the training operation includes assigning each of the building blocks with a respective block index taken from a distribution of block indices. The training operation may also include, for each iteration: selecting a building block or a block index from the distribution of block indices; dropping all building blocks with block indices greater than the selected building block or the selected block index; and performing training on the remaining building blocks. The selecting may be a random selection. The distribution may be a categorical distribution or a geometric distribution. The dropping may alternatively be dropping all building blocks with block indices greater than or equal to the selected building block or the selected block index. In an embodiment in which the neural network includes multiple layers, the distribution (e.g., the categorical distribution or the geometric distribution) for different layers may be independent. The block indices of the building blocks may be different (e.g., each building block has a unique block index). Alternatively, the block indices of some of the building blocks may be the same.

In one embodiment of the fourth aspect, the training operation can be selectively applied to different levels of the artificial neural network. These levels include bit-level, neuron-level, channel-level, path-level, and layer-level.

In one embodiment of the fourth aspect, the building blocks are quantization functions associated with quantization bits. The quantization functions may include different Heaviside step functions. A sum of the Heaviside step functions corresponds to a weighted sum of the quantization bits, which corresponds to quantization values.

In one embodiment of the fourth aspect, the building blocks are weights of a dense layer. A weighted sum of the inputs (weighted according to the weights) forms an output of the dense layer.

In one embodiment of the fourth aspect, the building blocks are input channels of a convolution layer. A weighted sum of outputs of the channel forms a pixel in an output feature map of the convolution layer.

In one embodiment of the fourth aspect, the building blocks are residual paths or blocks in ResNeXt. A sum of the outputs of the residual paths or blocks forms an output.

In one embodiment of the fourth aspect, the building blocks are paths in a convolution neural network with multiple layers and residual connections. A sum of outputs of the paths forms an output.

In a fifth aspect of the invention, there is provided a non-transistory computer readable medium storing computer instructions that, when executed by one or more processors, are configured to cause the one or more processors to perform the method of the first aspect. For the embodiment with multiple processors, the processors may be arranged in the same device or may be distributed in different devices.

In a sixth aspect of the invention, there is provided an article including the computer readable medium of the fifth aspect.

In seventh aspect of the invention, there is provided a computer program product storing instructions and/or data that are executable by one or more processors, the instructions and/or data are configured to cause the one or more processors to perform the method of the first aspect.

In an eighth aspect of the invention, there is provided a computer-implemented method for implementing an artificial neural network. The artificial neural network is an adaptively deployable artificial neural network that defines a plurality of nested artificial neural sub-networks. The method includes determining an optimal configuration of the artificial neural network for deployment at an electrical device, and deploying the artificial neural network with the optimal configuration at the electrical device. The electrical device may be an information/data handling system. The electrical device can be of any type and form, e.g., a desktop computer, a laptop computer, a tablet computer, a smart phone, a smart watch, an IoT device, an autonomous or smart vehicle, video surveillance device, a smart home control device, etc. The artificial neural network may include a plurality of additive building blocks each defined by a respective basis function. The artificial neural network may include one or more layers each with a plurality of additive building blocks each defined by a respective basis function.

In one embodiment of the eighth aspect, the determining includes selecting one of the plurality of nested artificial neural sub-networks based on resource configuration of the electrical device. The selection may be based on a predetermined lookup table or optimization curve matching different resource configurations to different sub-networks.

In one embodiment of the eighth aspect, the determining includes searching the artificial neural network using a heuristic search algorithm to determine components to be removed from the artificial neural network to obtain the optimal configuration.

In one embodiment of the eighth aspect, the determining is performed without re-training or re-tuning of the artificial neural network.

In one embodiment of the eighth aspect, the optimal configuration is the first optimal configuration; and the method further includes determining a second optimal configuration of the artificial neural network for deployment at the same electrical device that has a different resource configuration (e.g., due to change of operation mode, change of operation power). The determining may be performed without re-training or re-tuning of the artificial neural network.

In one embodiment of the eighth aspect, the electrical device is a first electrical device, the optimal configuration is the first optimal configuration; and the method further includes determining a second optimal configuration of the artificial neural network for deployment at a second electrical device. The determining may be performed without re-training or re-tuning of the artificial neural network.

In one embodiment of the eighth aspect, the determining of the first and second optimal configurations are performed simultaneously. The determining may be performed without re-training or re-tuning of the artificial neural network.

In one embodiment of the eighth aspect, the determining includes selecting one of the plurality of nested artificial neural sub-networks based on resource configuration of second the electrical device. The selection may be based on a predetermined lookup table or optimization curve matching different resource configurations to different sub-networks.

In one embodiment of the eighth aspect, the determining includes searching the plurality of nested artificial neural sub-networks using a heuristic search algorithm.

In one embodiment of the eighth aspect, the method further includes: deploying the artificial neural network with the second optimal configuration at the second electrical device.

In one embodiment of the eighth aspect, the first and second electrical devices have different resource configurations. The different resource configurations may be different computing resource configurations, e.g., dependent on energy level, operation modes. In one embodiment, the first and second electrical devices are of different types. For example, the first electrical device is a smart phone and the second electrical device is a desktop computer. In another embodiment, the first and second electrical devices are of the same type but different resource configurations. For example, the first and second electrical devices are both a smart phone but with different CPU cores, memory sizes, disk sizes, etc.

In one embodiment of the eighth aspect, the method includes: obtaining the artificial neural network prior to the determining.

In one embodiment of the eighth aspect, the optimal configuration is optimal with respect to the electrical device in terms of (i) prediction accuracy of the artificial neural network and (ii) one or more of computing overhead and computing speed. Additionally or optionally, the second optimal configuration is optimal with respect to the second electrical device in terms of (i) prediction accuracy of the artificial neural network and (ii) one or more of computing overhead and computing speed.

In one embodiment of the eighth aspect, the heuristic search algorithm includes: maintaining a set (T) of trajectory sets, each trajectory set (t) containing records of removed building blocks or order of removal of building blocks. Subsequent building blocks to be removed are selected based on the set of trajectory sets. In one implementation, the heuristic search algorithm may include: applying a sliding window to the building blocks, the sliding window defining a candidate set of building blocks. The heuristic search algorithm may then include, for each trajectory set t, in each iteration: sampling C candidate block(s) from the candidate set defined by the sliding window; and adding the sampled candidate block(s) to the trajectory set (t). The heuristic search algorithm may further include evaluating accuracy of all trajectory sets; and updating the set T with the trajectory sets evaluated to be the most accurate. In (b) the sliding window may be applied from the building blocks with lowest importance level to the building blocks with highest importance level. In an embodiment in which the neural network has multiple layers, steps (b) to (e) are applied to at least two layers of the artificial neural network. The layers may include different number of building blocks, and the sliding windows for the layers are configured to cover the same proportion of building blocks per layer.

In one embodiment of the eighth aspect, the artificial neural network is the artificial neural network of the second aspect.

In a ninth aspect of the invention, there is provided an electrical device with an artificial neural network deployed based on the method of the eighth aspect.

In a tenth aspect of the invention, there is provided a system with multiple electrical devices each including an artificial neural network deployed based on the method of the eighth aspect. The electrical devices may include the first and second electrical devices.

In an eleventh aspect of the invention, there is provided a system for implementing an artificial neural network. The artificial neural network is an adaptively deployable artificial neural network that defines a plurality of nested artificial neural sub-networks. The system includes one or more processor configured to: determine an optimal configuration of the artificial neural network for deployment at an electrical device, and deploy the artificial neural network with the optimal configuration at the electrical device.

In one embodiment of the eleventh aspect, the one or more processors are configured to perform the determination by selecting one of the plurality of nested artificial neural sub-networks based on resource configuration of the electrical device. The selection may be based on a predetermined lookup table or optimization curve matching different resource configurations to different sub-networks.

In one embodiment of the eleventh aspect, the one or more processors are configured to perform the determination by searching the artificial neural network using a heuristic search algorithm to determine components to be removed from the artificial neural network to obtain the optimal configuration.

In one embodiment of the eleventh aspect, the one or more processors are configured to perform the determination without re-training or re-tuning of the artificial neural network.

In one embodiment of the eleventh aspect, the optimal configuration is the first optimal configuration; and the one or more processors are further configured to determine a second optimal configuration of the artificial neural network for deployment at the same electrical device that has a different resource configuration (e.g., due to change of operation mode, change of operation power). The determination may be performed without re-training or re-tuning of the artificial neural network.

In one embodiment of the eleventh aspect, the electrical device is a first electrical device, the optimal configuration is the first optimal configuration; and the one or more processors are further configured to determine a second optimal configuration of the artificial neural network for deployment at a second electrical device. The determination may be performed without re-training or re-tuning of the artificial neural network.

In one embodiment of the eleventh aspect, the one or more processors are configured to perform the determinations of the first and second optimal configurations simultaneously. The determination may be performed without re-training or re-tuning of the artificial neural network.

In one embodiment of the eleventh aspect, the one or more processors are configured to perform the determination by selecting one of the plurality of nested artificial neural sub-networks based on resource configuration of second the electrical device. The selection may be based on a predetermined lookup table or optimization curve matching different resource configurations to different sub-networks.

In one embodiment of the eleventh aspect, the one or more processors are configured to perform the determination by searching the plurality of nested artificial neural sub-networks using a heuristic search algorithm.

In one embodiment of the eleventh aspect, the one or more processors are further configured to deploy the artificial neural network with the second optimal configuration at the second electrical device.

In one embodiment of the eleventh aspect, the first and second electrical devices have different resource configurations. The different resource configurations may be different computing resource configurations, e.g., dependent on energy level, operation modes. In one embodiment, the first and second electrical devices are of different types. For example, the first electrical device is a smart phone and the second electrical device is a desktop computer. In another embodiment, the first and second electrical devices are of the same type but different resource configurations. For example, the first and second electrical devices are both a smart phone but with different CPU cores, memory sizes, disk sizes, etc.

In one embodiment of the eleventh aspect, the optimal configuration is optimal with respect to the electrical device in terms of (i) prediction accuracy of the artificial neural network and (ii) one or more of computing overhead and computing speed. Additionally or optionally, the second optimal configuration is optimal with respect to the second electrical device in terms of (i) prediction accuracy of the artificial neural network and (ii) one or more of computing overhead and computing speed.

In one embodiment of the eleventh aspect, the one or more processors are configured to perform the heuristic search algorithm. The heuristic search algorithm includes: maintaining a set (T) of trajectory sets, each trajectory set (t) containing records of removed building blocks or order of removal of building blocks. Subsequent building blocks to be removed are selected based on the set of trajectory sets. In one implementation, the heuristic search algorithm may include: applying a sliding window to the building blocks, the sliding window defining a candidate set of building blocks. The heuristic search algorithm may then include, for each trajectory set t, in each iteration: sampling C candidate block(s) from the candidate set defined by the sliding window; and adding the sampled candidate block(s) to the trajectory set (t). The heuristic search algorithm may further include evaluating accuracy of all trajectory sets; and updating the set T with the trajectory sets evaluated to be the most accurate. In (b) the sliding window may be applied from the building blocks with lowest importance level to the building blocks with highest importance level. In an embodiment in which the neural network has multiple layers, the one or more processors are configured to apply steps (b) to (e) to at least two layers of the artificial neural network. The layers may include different number of building blocks, and the sliding windows for the layers are configured to cover the same proportion of building blocks per layer.

In one embodiment of the eleventh aspect, the artificial neural network is the artificial neural network of the second aspect.

In one embodiment of the eleventh aspect, the one or more processors are provided by the electrical device. In one embodiment of the eleventh aspect, the one or more processors are provided by the first and/or second electrical device.

In a twelfth aspect of the invention, there is provided a non-transistory computer readable medium storing computer instructions that, when executed by one or more processors, are configured to cause the one or more processors to perform the method of the eighth aspect. For the embodiment with multiple processors, the processors may be arranged in the same device or may be distributed in different devices.

In a thirteenth aspect of the invention, there is provided an article including the computer readable medium of the twelfth aspect.

In fourteenth aspect of the invention, there is provided a computer program product storing instructions and/or data that are executable by one or more processors, the instructions and/or data are configured to cause the one or more processors to perform the method of the eighth aspect.

Expressions "neural network" and "artificial neural network" are used interchangeably herein, including in the following description.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 4 is a set of pseudocode illustrating a heuristic search algorithm in one embodiment of the invention;

FIG. 5A is a graph showing experiment results (based on a Cifar10 dataset) of performance a neural network with respect to removed bottleneck modules in one embodiment of the invention;

FIG. 5B is a graph showing experiment results (based on a Cifar100 dataset) of performance a neural network (same as the one in FIG. 5A) with respect to removed bottleneck modules in one embodiment of the invention;

FIG. 5C is a graph showing experiment results (based on a Cifar10 dataset) of performance a neural network with respect to removed paths in one embodiment of the invention;

FIG. 5D is a graph showing experiment results (based on MNIST) of performance a neural network with respect to removed neurons in one embodiment of the invention;

FIG. 5E is a graph showing experiment results (based on a Cifar10 dataset) of performance a neural network with respect to removed channels in one embodiment of the invention;

FIG. 5F is a graph showing experiment results (based on a Cifar100 dataset) of performance a neural network with respect to removed channels in one embodiment of the invention;

FIG. 5G is a graph showing experiment results (based on a Cifar10 dataset) of performance a neural network with respect to removed step functions (bit related) in one embodiment of the invention;

FIG. 5H is a graph showing experiment results (based on a Cifar100 dataset) of performance a neural network with respect to removed step functions (bit related) in one embodiment of the invention;

DETAILED DESCRIPTION

Figure 1B:
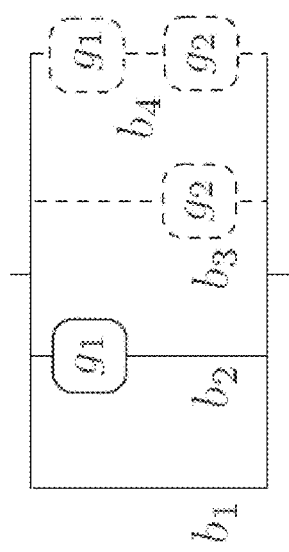
FIG. 1B is a schematic diagram of an equivalent presentation of FIG. 1A.

One of the objectives of one embodiment of the present invention is to provide a relatively simple method to train a neural network, preferably only once, and yield optimal sub-networks (SN) for different resource configurations or budgets. The sub-networks are nested in the sense that any smaller sub-networks form the basis of a larger one. In other words, when some building blocks are removed from a larger network or sub-network, the smaller sub-network comprising the remaining blocks is still reasonably complete and accurate. The method is preferably unified, i.e., it can be applied to different levels of the neural network: layers, residual paths, channels, neurons, and bits.

An intuition on the way/means to achieve this objective is from the classic boosting techniques, where a strong classifier is formed by an expansion of weak classifiers. The weak classifiers are ordered such that the latter classifier approximates error between ground-truth and the prior classifier. From this perspective, boosting is nested in nature as a smaller expansion of classifier forms the basis of a larger one. In a well-trained boosting model, removing the latter classifier does not substantially affect the performance. Thus, in this invention, the similarity between several building blocks of a network and the weak classifier in boosting is exploited. The inspiration is further extended to quantization bits by constructing nested quantization functions. To rank the building blocks efficiently in one embodiment, an ordered dropout (ODO) operation that samples a nested sub-network in each mini-batch during training is applied. Details of the ordered dropout operation are provided below. In contrast to standard dropout that acts on a single block, ordered dropout is applied to a sequence of building blocks to order them based on importance. The intuition of ordered dropout is to mimic the case that, during testing (using testing data), an arbitrary number of blocks can be removed according to the resource budget. Mathematically, it has been shown below that, in expectation, each block maximizes a term of incremental information gain. As a result, in embodiments of the present invention, the whole network is fully nested, thus also referred to as a fully nested neural network ($FN^3$). Unlike boosting that uses a greedy method to pick the next classifier and does not update the previous classifiers, ordered dropout learns the whole set of nested classifiers simultaneously. In one embodiment, during the inference stage, to determine an optimal accuracy with respect to the number of blocks, a heuristic search algorithm can be applied. The heuristic search algorithm is detailed below and it leverages the order of blocks to reduce the search complexity from $O(2^N)$ to $O(N)$, where N is the number of blocks.

One of the objectives of one embodiment of the present invention is to find the basic building block of a nested neural network $FN^3$ and a corresponding training scheme, such that during testing (using testing data), a certain number of blocks can be removed according to the resource budget, while a high accuracy can be maintained without re-training or fine-tuning.

The inspiration of this design embodiment comes from the family of boosting techniques, where x is the input data, a classifier $f_M(x)$ is composed with a sequence of basis function $b_m = b(x; \gamma_m)$, $m \in \{1, \ldots, M\}$, and $\gamma_m$ is the parameter of the m-th basis function. The basis function expansions are combined to produce the final prediction, $f_M(x) = \Sigma_m \beta_m b(x; \gamma_m)$. Typically, these models are fit by minimizing this goal, $$\min_{\{\beta_m, \gamma_m\}_1^M} \mathbb{E}_{x,y \sim p_{x,y}} L\left(y, \sum_{m=1}^{M} \beta_m b(x; \gamma_m)\right).$$

The additive characteristic of boosting enables some basis function to be removed while the remaining part of model may still produces useful result. Another characteristic of boosting is that each basis function $b_m$ approximates the residual under the current model, i.e., the difference between the ground truth and the current prediction. For example, for squared error loss, $$L(y_i, f_{m-1}(x) + \beta_m b(x_i; \gamma_m)) = (r_{im} - \beta_m b(x_i; \gamma_m))^2 \quad (1)$$

the m-th term $\beta_m b(x_i; \gamma_m)$ best fits the residual error $r_{im} = y_i - f_{m-1}(x_i)$ incurred by the previous expansion. Therefore, each $b_m$ contributes less as m goes from 1 to M. This residual characteristic of boosting enable ranking of the basis function according to the importance such that the less significant basis function can be removed first if needed. Once the additive basis function are obtained and made to approximate the residual error, groups of basis functions can be stacked to a deep model for better performance.

Figure 1A:
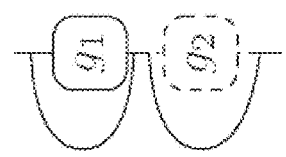
FIG. 1A is a schematic diagram illustrating building blocks at a network level of a neural network in one embodiment of the invention.

Many parameterized building blocks ("building blocks", "blocks", and "basis function" are used interchangeably herein) in a convolutional neural network possess the additive characteristic. These building blocks can form the basis of the neural network embodiments of the present invention. These parameterized building blocks, shown in FIGS. 1A to 1F, can be classified into several categories. Five exemplary categories are provided below:

Network-level: A convolutional neural network with residual connections behaves like the ensemble of shallow networks. As seen in FIGS. 1A and 1B, the output of such network can be seen as the summation of $O(2^n)$ paths, $$f_M(x) = \sum_{m=1}^{M} b_m(x)$$

$M = 2^n$, where each path is a combination of blocks from the set of n residual blocks, i.e., $b_m(x) = g_n^{I_n(m)}(\ldots g_0^{I_0(m)}(x))$ and $I_n(m)$ is the indicator function. In one example, the building blocks are paths in the convolution neural network with, and a sum of outputs of the paths forms an output. "FN³-layer" is used to denote an embodiment of neural network formed based on such blocks.

Figure 1C:
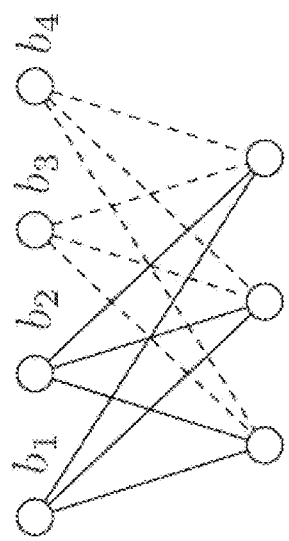
FIG. 1C is a schematic diagram illustrating a first type of building blocks at a layer level of a neural network in one embodiment of the invention.

Layer-level (1): In a dense layer, as shown in FIG. 1C, $h_l = f(h_{l-1}, \Gamma) = \Gamma_i^T h_{l-1}$, where $h_l$ is the l-th layer activation and $\Gamma$ is the weight matrix. The i-th dimension of output can be written as the weighted sum of input, i.e., $h_{l,i} = \Gamma_i^T h_{l-1}$. In one example, the building blocks are inputs weights of a dense layer, and a weighted sum of the inputs (weighted according to the weights) forms an output of the dense layer. "FN³-neuron" is used to denote an embodiment of neural network formed based on such blocks.

Figure 1D:
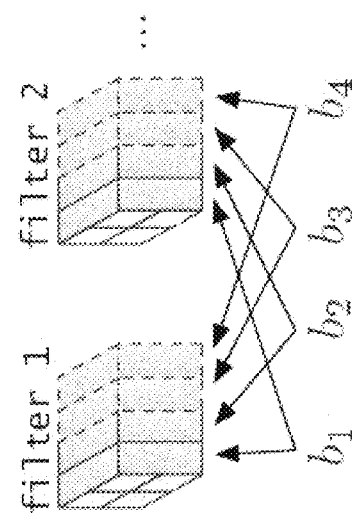
FIG. 1D is a schematic diagram illustrating a second type of building blocks at a layer level of a neural network in one embodiment of the invention.

Layer-level (2): In a convolutional layer, as shown in FIG. 1D, every pixel on an output feature map can be written as the weighted sum of input channels, where the weights are from the channels of a convolutional filter. In one example, the building blocks are input channels of the convolution layer, and a weighted sum of outputs of the channels forms a pixel in an output feature map of the convolution layer. "FN³-channel" is used to denote an embodiment of neural network formed based on such blocks.

Figure 1E:
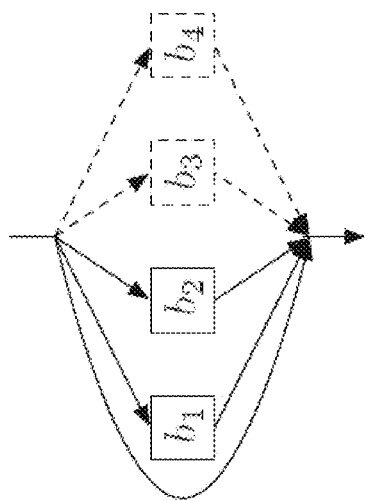
FIG. 1E is a schematic diagram illustrating a third type of building blocks at a layer level of a neural network in one embodiment of the invention.

Layer-level (3): In a residual block of ResNeXt, as shown in FIG. 1E, the output of a block can be written as sum of different paths. In other words, a layer output as a sum of parallel residual blocks in ResNeXt. In one example, the building blocks are residual paths or blocks in ResNeXt, and a sum of outputs of the residual paths or blocks forms an output. "FN³-path" is used to denote an embodiment of neural network formed based on such blocks.

Figure 1F:
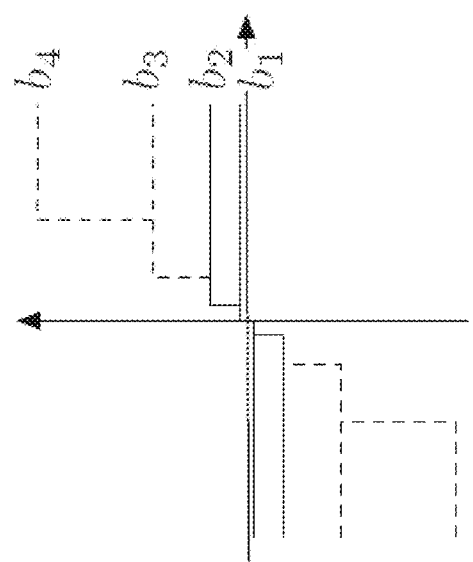
FIG. 1F is a schematic diagram of illustrating building blocks at a bit level of a neural network in one embodiment of the invention.

Bit-level: An extreme case is to consider a quantization bit as a building block, as shown in FIG. 1F. As directly training with integer weights is difficult, a nested quantization function $\overline{S}(\cdot)$ is used instead. $\overline{S}(\cdot)$ maps the full-precision weight w to $\overline{w}$. To construct $\overline{S}(\cdot)$, the summation of several scaled and transformed Heaviside step functions are used, i.e., $\overline{w} = \overline{S}(w_i) = \Sigma_j \alpha_j S(w_i - z_j)$. Thus, the quantization function possesses the additive characteristic. In one example, the building blocks are quantization functions associated with quantization bits, and a sum of the Heaviside step functions corresponds to a weighted sum of the quantization bits, which corresponds to quantization values. The quantization functions may include different Heaviside step functions. "FN³-bit" is used to denote an embodiment of neural network formed based on such blocks.

In one embodiment, a unified method is provided to rank the building blocks such that the blocks are nested.

Intuitively, one approach may be to imitate boosting: 1) train a few blocks as the base model; 2) fix the parameters of the base model, add new blocks to the model and train the new blocks; 3) repeat the second step until the total size of model meets the need. However, as the number of blocks varies among different layers, it is difficult to determine the number of augmented blocks (granularity) for different layers. Furthermore, the model would lack of flexibility if the granularity is large, and would cause prohibitively long training time if the number is too small. Also, since the previous blocks are fixed in each step, such approach would be not end-to-end trained, which could limit its accuracy. As a result such intuitive approach does not work in the embodiments of the present invention.

In one embodiment, the unified method includes an Ordered Dropout (ODO) operation that randomly selects nested sub-networks during training batches, which encourages ordering of the importance of each block. Each block in a group is labelled with an index. Then a block index is sampled or otherwise selected from a probabilistic distribution of indices. All blocks with indices greater than the chosen block are dropped. In one example, a Categorical distribution $C(m)$ is assigned over index $m \in \{1, \ldots, M\}$ of the blocks $b_m$. During training, the index $c \sim C(m)$ is sampled then blocks with index m>c are disabled. The expansion with some of the blocks dropped can be written as $$f_c(x) = \sum_{i=1}^{c} \beta_i b(x; \gamma_i),$$

which may e dubbed as partial expansion. The parameter of $C(m)$ is set to be uniform, i.e., $(m) = 1/M$. As the m-th block is kept only when the sampled index$\leq$m, the probability of keeping m-th block is $$\beta_m = \frac{M + 1 - m}{M}.$$

Since $\beta_m$ is a monotonically decreasing function of m, the blocks are forced to be ordered through this operation. During testing (using testing data), to make the output of a block equal to the expected output at training time, the output is also scaled by $\beta_m$. So the basis function expansion for a test data x is written as $$f_M(x) = \sum_{m=1}^{M} \frac{M + 1 - m}{M} b(x; \gamma_m).$$

The ordered dropout operation can mimic the scenario that an arbitrary number of building blocks (bits, neurons, filters, paths, residual blocks etc.) can be removed during testing. As the blocks with smaller indices are more likely to be kept, they obtain more information compared to higher-index blocks and thus become more important. Furthermore, as the higher-index blocks are disabled frequently, the small-index blocks must be able to perform the task themselves. The problem of granularity is solved because the granularity is always as small as one block, while it does not increase the time/resource consumption.

FIGS. 1A to 1F show how ordered dropout can be applied to different blocks. Note that in FIGS. 1A to 1F, the dotted lines indicate dropped blocks and/or their associated components (in this case the sampled index is c=2) in one iteration. The solid lines indicate the remained blocks.

In one embodiment, the ordered dropout operation is applied on building blocks of convolutional neural network for supervised learning, with the goal of adaptive deployment of neural network. A neural network trained with ordered dropout and the maximum likelihood estimation (MLE) objective will lead to each block maximizing an incremental information gain over the previous blocks, yielding residual additive blocks, as explained below.

To illustrate the performance of the ordered dropout operation, the following example shows that in a one-layer neural network for a supervised learning task, training with ordered dropout using the MLE objective leads to disentangled information gain between blocks.

Denote the ground truth joint likelihood as $x,y \sim p_{x,y}$ and the discriminative model as $p_\Theta(y|x)=p_0(y|f_{M,\Theta}(x))$, where $x \in \mathbb{R}^D$, $y \in \mathbb{R}$. Assume $p_0$ is probability of ground truth conditioned on the prediction. Define the prediction $\hat{y}=f_{M,\Theta}(X)=v^T z=v^T \sigma(U^T x)$, where z is the hidden activation of a neural network and $U \in \mathbb{R}^{D \times M}, v \in \mathbb{R}^M$ are the parameters of the neural network. The full expansion can be written as $$\hat{y} = f_{M,\Theta}(x) = \sum_{i=1}^{M} v_i \sigma(U_i^T x),$$

where $U_i$ denotes the i-th column of matrix U.

Proposition 1. Under the above setting, maximizing the data log-likelihood is equivalent to maximizing the mutual information between ground-truth y and the prediction $\hat{y}$, i.e., $$\max_{\Theta} \mathbb{E}_{x,y \sim p_{x,y}} \log p_\Theta(y|x) \Leftrightarrow \max_{\Theta} \mathbb{I}(y, \hat{y}) \qquad (2)$$

where $\mathbb{I}(\bullet)$ is the mutual information.

Consider applying the ordered dropout operation on the elements of v (or equivalently on the columns of weight matrix U), the problem becomes $$\max_{\Theta} \mathbb{E}_{c \sim C} \mathbb{I}(y, f_c(x)) \qquad (3)$$

where $$f_c(x) = \sum_i^c b(x; U_i, v_i) = \sum_i^c v_i \sigma(U_i^T x)$$

the partial expansion of basis function.

Corollary 1. The maximum likelihood objective is equivalent to $$\max_{\Theta} \mathbb{I}_1 + \frac{1}{M} \sum_{c=2}^{M} (M-c)(\mathbb{I}_c - \mathbb{I}_{c-1}) \qquad (4)$$

where $\mathbb{I}_c = \mathbb{I}(y, f_c(x))$ is the mutual information between the ground-truth and partial expansion.

Combining neural network building blocks and ordered dropout does not explicitly compose a Forward Stage-wise Additive Model as in boosting in Equation 1. However, Equation 4 indicates the training objective is disentangled in a similar way. The objective includes a base mutual information $\mathbb{I}_1$ learned by the first block $b_1=b(\bullet; U_1, v_1)$, as well as $\mathbb{I}_c - \mathbb{I}_{c-1}$, which is the residual information learned by block $b(\bullet; U_c, v_c)$. In other words, in expectation, each building block maximizes the incremental information gain and aggregates the results for final prediction. Thus, combining neural network building blocks and ordered dropout leads to residual additive blocks. This analysis can be easily extended to $FN^3$-layer, $FN^3$-path and $FN^3$-channel described above.

The above description with respect to $FN^3$-bit has provided that the quantization function $\overline{S}$ possesses the additive characteristic. Ordered dropout operation can also be applied to the translated function $S_j(w)=S(w-z_j)$. To complete the quantization scheme, a factor T is used to scale the input and output and make the quantization function zero-cantered by using the offset $$\frac{1}{2} \sum_j \alpha_j.$$

$$\overline{S}(w_i) = \frac{1}{\tau}\left(\sum_j \alpha_j S(\tau w_i - z_j) - \frac{1}{2}\sum_j \alpha_j\right) \qquad (5)$$

Recently, Jin et. al. *Neural network quantization with adaptive bitwidths. arXiv preprint arXiv:*1912.09666, 2019 and Yu et. al. *Any-precision deep neural networks. arXiv preprint arXiv:*1911.07346, 2019 adopt the quantization function of DoReFa-Net to achieve a similar goal, and both these methods adopt switchable batch normalization for different bits. The inventors of the present invention note that these quantization methods may not be truly nested, as the quantization function in DoReFa-Net may not be nested in terms of different bits. As an illustration, the 2-bit and 3-bit quantization in DoReFa-Net correspond to quantization levels of $$Q_2 = \left\{-1, -\frac{1}{3}, \frac{1}{3}, 1\right\}$$

and $$Q_3 = \left\{-1, -\frac{6}{7}, \dots, -\frac{1}{7}, \frac{1}{7}, \dots, \frac{6}{7}, 1\right\}$$

respectively, and $Q_3$ does not include all the elements in $Q_2$. AdaBits provided in Jin et. al. *Neural network quantization with adaptive bitwidths. arXiv preprint arXiv:*1912.09666, 2019 modify the DoReFa-Net to address this issue.

Figures 2A, 2B:
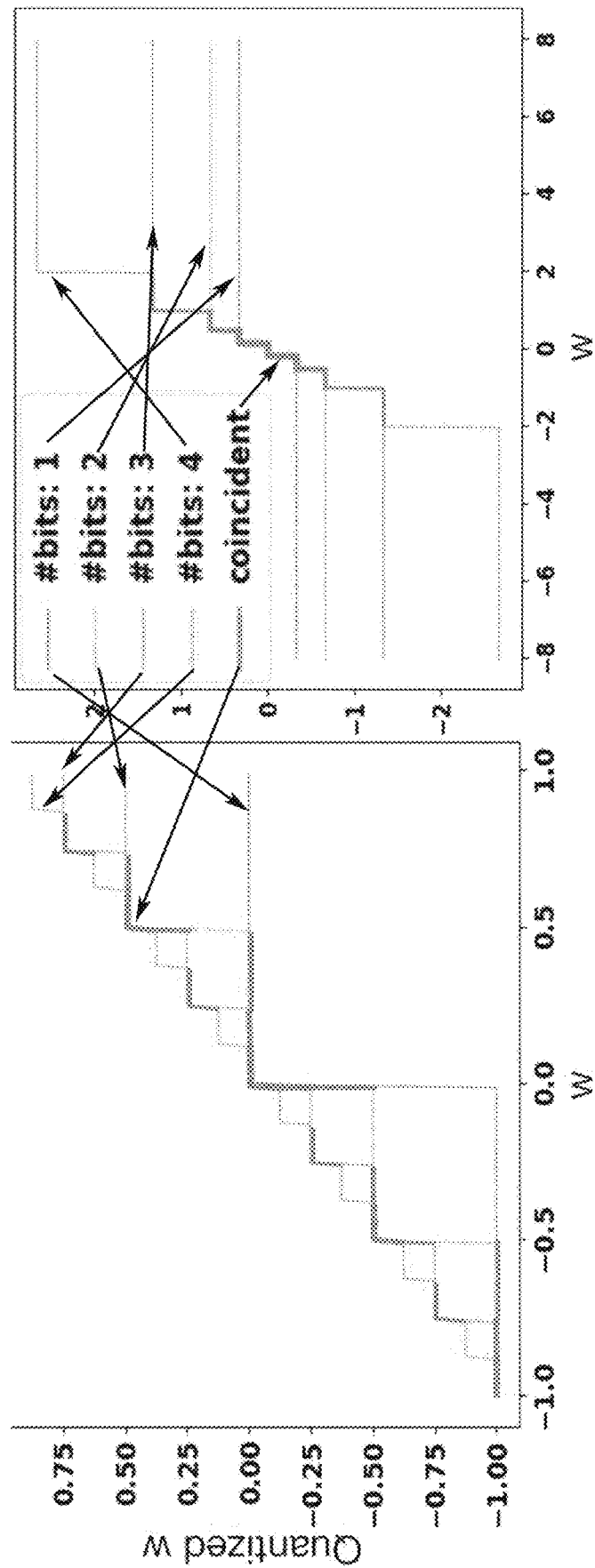
FIG. 2A is a graph showing the quantization functions associated with an existing neural network quantization scheme "AdaBits"
FIG. 2B is a graph showing the quantization functions associated with a neural network quantization scheme "$FN^3$-bit" in one embodiment of the invention.

FIGS. 2A and 2B show the quantization functions used in AdaBits and in the neural network in one embodiment of the invention. In the graphs, the thicknesses of the lines reflect the overlapping of two or more curves. In AdaBits, adding more bits is only back-tracking the previous lower-bit quantization function, which undermines the previous mapping. If the weight value indicates the importance of its corresponding feature, then once a weight has a maximal quantization value (+1 or −1), then increasing its importance requires changing bits on all other weights. Thus, in AdaBits, the disordered coinciding regions make the optimization harder, thus switchable batch normalization (multiple sets of batch normalization parameters) is adopted, leading to a semi-nested network. In contrast, in the neural network in one embodiment of the invention, adding more bits augments information of the previous quantization function, while keeping the steps in the middle unchanged. Adding a new bit can only increase the magnitude of weights, i.e., the corresponding feature's importance. This allows a more natural ranking of the features as the number of bits increases, and better fits the formulation of using additive blocks. From a regularization perspective, using a limited number of bits for quantization in the neural network in one embodiment of the invention also limits the magnitude of the weights, which is consistent with the goal of regularization. In contrast to AdaBits, with low bit numbers, the weights are either maximally activated (+1) or not activated, which are counter-productive for regularization.

In one embodiment, with a trained neural network, such as one trained based on the above method, it is possible to search for the best architectures for different resource configurations or budgets beforehand, preferably at a small or minimal granularity.

Figure 3:
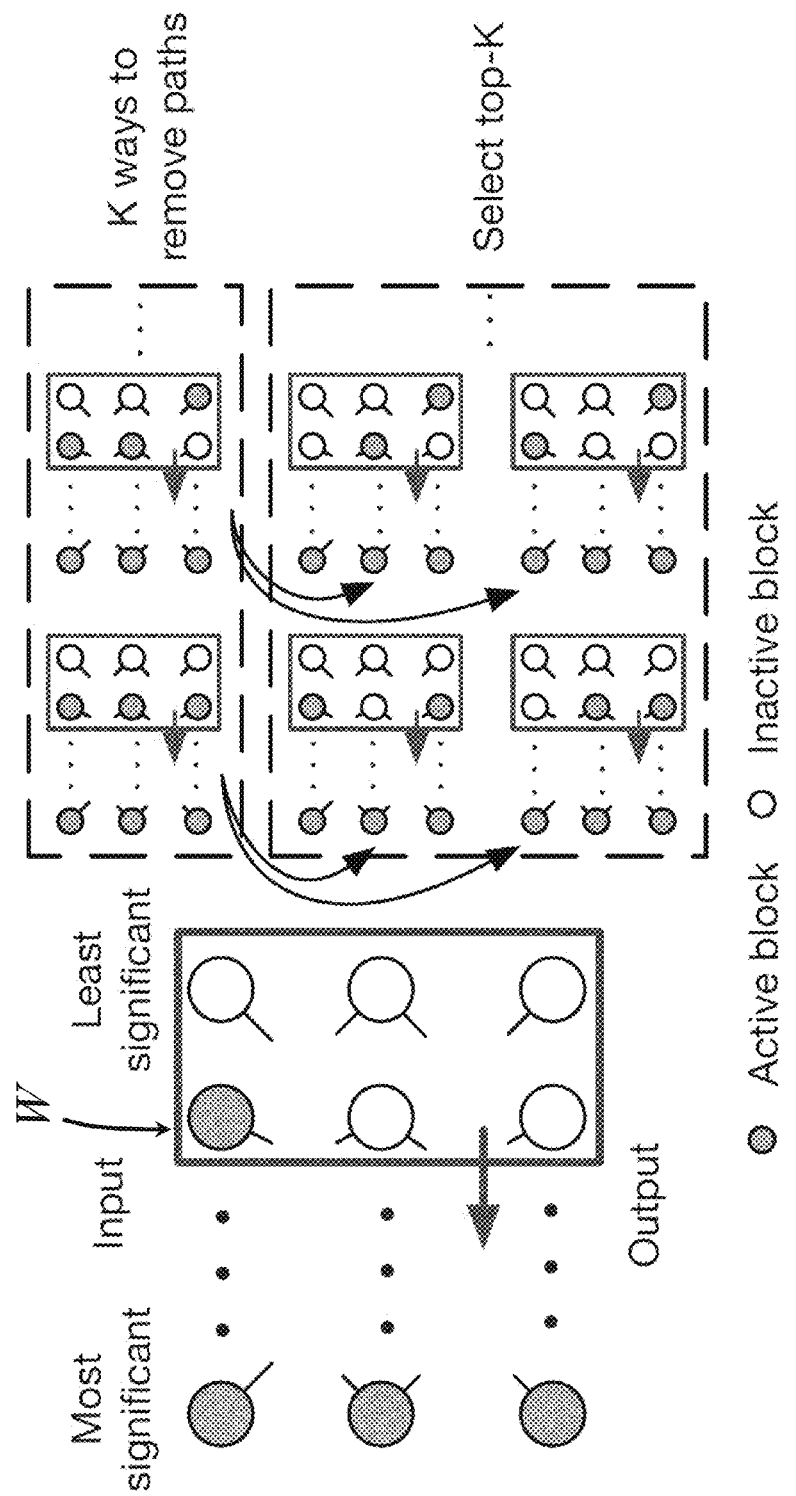
FIG. 3 is a schematic diagram illustrating operation of a heuristic search algorithm in one embodiment of the invention.

To this end, one embodiment of the invention provides a heuristic search method to find the optimal trade-off curve of accuracy with respect to number of blocks, as shown in Algorithm 1, 100, in FIG. 4. One of the key features of the heuristic search method is to maintain multiple records of removed blocks, denote as "trajectories". The next block to be removed is selected based on the current trajectories with high accuracy, and thus yields a new trajectory that is more likely to be accurate. Specifically, a set of K trajectory sets T are maintained during searching. $tj_k = \{(i,j)\} \in T$ is the k-th trajectory set that contains the layer index i and block index j of removed blocks. In each iteration, for one trajectory, C candidate block(s) are sampled from the candidate set and added to the trajectory set. The accuracy of all trajectories are evaluated and the top-K augmented trajectory sets are selected to update the set T. As the blocks are highly ordered in $FN^3$, a sliding window, W, is applied as the candidate set to restrict the search space, as shown in FIG. 3. With this sliding window, the search complexity is reduced from $\Sigma i(_i^N) = 2^N - 1$ to KN. In an embodiment in which the number of blocks are different in different layers, e.g., layer 1 has 128 neurons while layer 2 has 512 neurons, the same proportion (T) of blocks is applied to the sliding window for different layers, e.g., 32 neurons for layer 1 and 128 neurons for layer 2 (25%).

Experiments have been performed based on the methods of the above embodiments, to evaluate their performance and to compare them with respective existing methods. The comparison is described below, followed by a presentation of the experimental results.

Adaptive channel: Aiming at adaptive channel and neuron, Kim et. al.: *Learning nested sparse structures in deep neural networks. In Proceedings of the IEEE Conference on Computer Vision and Pattern Recognition*, pages 8669-8678, 2018 has proposed a NestedNet to build an n-in-1 network structure by solving weight connection pruning problem iteratively. Kim's work is limited in flexibility as it provides limited number of sub-networks (3 to 4 levels shown in the experiment), while the present embodiment of the invention has 27136 with MobileNet-V2 in terms of adaptive channel. The present embodiment of the invention also outperforms Kim: on Cifar10/100, Kim's accuracy starts to decrease when half of the channels are pruned; in the present embodiment, the accuracy starts to decrease when over 65% components are dropped.

Yu et. al. *Slimmable neural networks. International Conference on Learning Representations*, 2019. has proposed a slimmable neural network that trains a network with multiple setups of channel number (called width) simultaneously, where the weights are shared among different widths. The neural network switches to another set of batch normalization parameters once the width changes thus $O(M^2)$ batch normalization parameters should be maintained, where M is the number of channels in a layer. This method is extended in Yu et. al: *Universally slimmable networks and improved training techniques. Proceedings of the IEEE International Conference on Computer Vision*, pages 1803-1811, 2019, which discloses "US-Net" to allow more choices of width by only recollecting the batch normalization parameters after training. However, it still requires training multiple widths per iteration, which increases the training time. The widths are consistent for different layers, and therefore the number of sub-networks is limited. By comparison, in an $FN^3$-channel embodiment of the invention, different number of channels can be sampled for different layer per iteration, thus increasing the number of sub-network by $2^{N-M}$ and indicating a higher level of granularity, where $N = \Sigma_i M_i$. In addition, the increased number of sub-networks in the $FN^3$-channel embodiment does not come at a price of increasing training time, making it more efficient than the slimmable neural network.

In the neural network embodiment of the invention, it can be observed that as the importance of blocks keeps decreasing in expectation, the influence of dropping blocks on batch normalization parameters is trivial. Also as observed from the scaling factor during inference $$\beta_m = \frac{M+1-m}{M},$$

as m increases, the activation is scaled to decrease, which has low influence on batch normalization statistics. As a result the neural network embodiment of the invention does not require modification of the batch normalization scheme.

Adaptive bit ("AdaBits"): Jin et. al. *Neural network quantization with adaptive bitwidths. arXiv preprint arXiv:* 1912.09666, 2019. has provided AdaBits that is adaptive in different quantization bits. A quantization scheme similar to DoReFa-net was proposed and the switchable batch normalization method in Yu et. al. *Slimmable neural networks. International Conference on Learning Representations*, 2019. was adopted, thus the number of sub-networks is limited. The limitation of the AdaBits quantization function has been presented above with respect to FIGS. 2A and 2B.

It is important to note that the order of either channels or bits was not studied in any of the referenced works. As presented above, in the present embodiments, each building block in the neural network increases or maximizes the incremental information gain. The analysis validates the idea of using residual additive blocks to build the adaptive neural network. Furthermore, the previous methods do not provide the optimal sub-network based on a given hardware resources. In an neural network embodiment of the invention, a fast heuristic search method that leverages the block ordering is used. A trade-off curve of accuracy with respect to the number of blocks may be obtained before deployment of the neural network, e.g., at a low cost. In one example, given a fixed budget of resources, the optimal architecture can be simply obtained by referring to the trade-off curve and table lookup (OVIC Benchmark, Tensorflow).

To validate the idea of the above embodiments of the invention, experiments are conducted on the MNIST, Cifar10, Cifar100 and ImageNet datasets. The $FN^3$-neuron experiment is conducted on MNIST. Ablation study of $FN^3$-layer/-path/-channel/-bit, as well as the comparisons of $FN^3$-bit and AdaBits, are performed on Cifar10/100. Experiments of $FN^3$-channels and related comparison with US-Net are run on ImageNet. For $FN^3$-bit, ordered dropout is realized by adding/dropping Heaviside step functions that constitute different quantization functions. The weights in one layer share a quantization function. Thus, in the heuristic search, the block index is replaced with index of Heaviside step function. For the other block types (other than bit-), ordered dropout is realized by generating masks of ones and zeros onto the input or output of a block. Heuristic search is run on the training data to get the block order. During searching, one number of blocks might correspond to multiple results (e.g., 50 accuracy results for "100 channels removed"). The maximum, mean and standard deviation are calculated and shown in graphs of FIGS. 5A to 5H. Specific set-ups of the experiments are as follows.

$FN^3$-layer: A standard RexNeXt-Cifar, as presented in Xie et. al., *Aggregated residual transformations for deep neural networks. In Proceedings of the IEEE conference on computer vision and pattern recognition*, pages 1492-1500, 2017., is run on Cifar10 and Cifar100 dataset. ResNeXt-Cifar contains one convolutional layer for feature extraction which is kept active in this experiment, and 9 bottleneck modules each being treated as a block. A uniform probability 1/9 is assigned to the Categorical distribution C(m) where each dimension corresponds to the index of bottleneck module. Therefore, the first bottleneck module is the least likely to be dropped. The following parameters are used: SGD with an initial learning rate 0.1, momentum factor 0.9 and batch size 128. The learning rate is scaled by 0.1 at epoch 150 and 225. The neural network is trained for 300 epochs. For heuristic search, as the ordered dropout is performed on the bottleneck modules (group of layers), the height of sliding window is one. Because these blocks are well ordered, the window width is set to be 1 ($\Delta_p$=1/9). In other words, the algorithm greedily selects the next block to be removed.

$FN^3$-path: The same RexNeXt-Cifar as in $FN^3$-layer is run on Cifar10 and Cifar100 dataset. In each bottleneck module, 8 paths are treated as the blocks. A uniform probability 1/8 is assigned to the Categorical distribution C(m) where each dimension corresponds to the index of blocks. 9 ordered dropout units operate simultaneously. The rest hyper-parameters are the same as $FN^3$-layer. In such case, for heuristic search, the height of sliding window is 9. $\Delta_p$=12.5%, C=10 and K=3.

$FN^3$-channel: To compare with previous works, the experiment runs with MobileNet-V2 on ImageNet dataset. The ordered dropout mask is applied to the depth-wise convolution layer in each inverted residual block. Therefore, it disables the filters of former point-wise convolution, depth-wise convolution and the channels of subsequent point-wise convolution. 35% of the channels are kept active during the experiment for a fair comparison. As there are 17 inverted residual blocks, 17 ordered dropout units operate simultaneously. The model is optimized with Adam optimizer with initial learning rate 0.1 and a cosine annealing scheduler for 400 epochs, on 6 GTX 2080ti GPUs. In each forward pass of the neural network, for each ordered dropout unit, the sampled index m~C(•) is broadcasted to all GPUs for consistency. For heuristic search, the height of sliding window is 17. $\Delta_p$=12.5%, C=10 and K=3. On Cifar10/100, similar settings are adopted.

$FN^3$-neuron: A multilayer perceptron (MLP) of structure 784-512-128-10 are run on MNIST. 12.5% of the neurons are kept active during the experiment. Two ordered dropout units are applied on the rest neurons in two hidden layers, with uniform probabilities 1/448 and 1/112 respectively. The neural network is trained with SGD with an initial learning rate 1.0 for 100 epochs. The learning rate is scaled by 0.7 every 10 epochs. For heuristic search, the height and width of window are set to be 1, similar to $FN^3$-layer.

FIGS. 5A to 5H illustrate the respective results.

Generally speaking, the blue curves show the accuracy with respect to removed building blocks with normal training. The removed building blocks are randomly selected and each random test is repeated for 100 times. In all the tested cases, the accuracy decreases drastically as building blocks are removed. The orange curves show the results of ordered dropout training and random removal. On $FN^3$-layer/-neuron/-bit (FIGS. 5A, 5B, 5D, 5G, 5H), the differences between orange curves and blue curves are significant. This indicates ordered dropout effectively improves the overall classification performance. On $FN^3$-bit (FIGS. 5G, 5H), ordered dropout also improves the quantization performance of the whole network, as observed from the difference of starting points of the orange and blue curves. As for $FN^3$-path (FIG. 5C), the mean of accuracy has a similar trend as normal training, while the max accuracy starts decreasing when around 40 paths are removed. Therefore, ordered dropout effectively generates highly accurate and small sub-networks. The orange curve of $FN^3$-channel (FIGS. 5E, 5F) shows a similar behavior as $FN^3$-path (FIG. 5C) while the fluctuation of max accuracy is more severe, which indicates the unstable performance of random removal. The green curves show the results of ordered dropout training and heuristic search. In general, the heuristic search effectively finds a better trade-off curve. Moreover, as observed from the results of $FN^3$-channel (FIGS. 5E, 5F) and $FN^3$-path (FIG. 5C), the variance is significantly reduced and useless trajectories are pruned, thus the search complexity is reduced. This indicates the heuristic search can discover good sub-networks efficiently. The heuristic search also helps to reduce the number of evaluations during searching. For example, on $FN^3$-path (FIG. 5C), the number of evaluations in random removal is 7200, while that in heuristic search is 1672, reduced by 76.8%.

A more detailed discussion on the experiments of $FN^3$-channel and $FN^3$-bit, and their comparison with existing works, are provided below.

$FN^3$-channel: The $FN^3$-channel is trained with MobilenetV2 on Imagenet. The ordered dropout mask is multiplied with the output of depth-wise convolution layer in each inverted residual block. Therefore, the zeros in the mask disable the corresponding filters of preceding point-wise convolution, depth-wise convolution and the channels of subsequent point-wise convolution.

Figure 6:
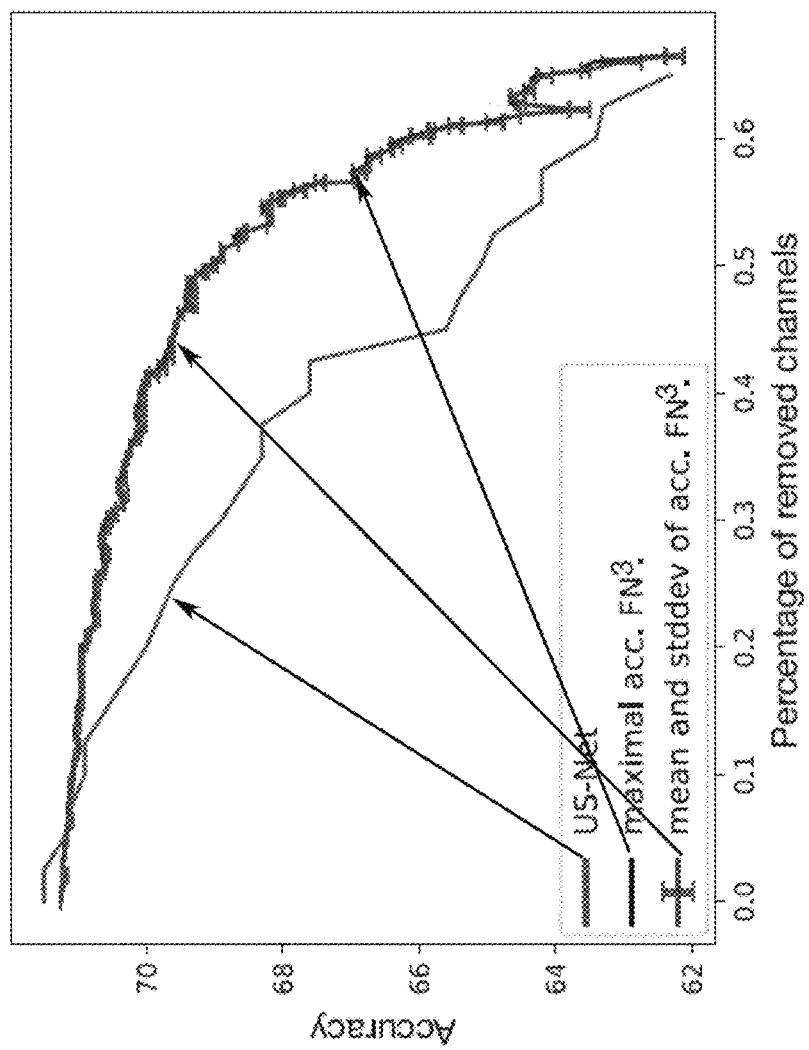
FIG. 6 is a graph comparing experiment results of performance a neural network with respect to removed channels in one embodiment of the invention and an existing method "US-Net"

FIG. 6 is a graph that shows that $FN^3$-channel achieves a better trade-off of accuracy with respect to removed blocks compared with US-Net. This reveals the advantage of ordered dropout over other methods that do not consider order of blocks. As shown in Table 1, as $FN^3$ is fully nested, the theoretical number of sub-networks is much greater than that of US-Net. The training epochs of $FN^3$ is steady at 400, while that of US-Net is 250n, where n is the number of sampled widths per iteration (normally n≥4).

TABLE 1

Numerical comparisons.

| Model | #sub-networks | Training epochs |
|---|---|---|
| US-Net | $2^{26}$ | 250 × n |
| $FN^3$-channel | $2^{7196}$ | 400 |

$FN^3$-bit: The experiments on quantization are run on Cifar10/100 datasets with MobileNet-v2. The model is optimized with Adam and a cosine annealing scheduler for 600 epochs. In $FN^3$-bit, a quantization level schedule as follows is used: 2-bit: $\{-1, 0, 1\}$, 3-bit($\pm 2$): $\{-2,-1, 0, 1, 2\}$, 3-bit($\pm 4$): $\{-4,-2,-1, 0, 1, 2, 4\}$, 4-bit: $\{-8,-4,-2,-1, 0, 1, 2, 4, 8\}$. T is initialized to 5p/4q, where p is the max absolute quantization interval and q is the max absolute value of weight. To reproduce the AdaBits method, the modified DoReFa-net quantization function and switchable batch normalization parameters are used. Following Jin et. al. *Neural network quantization with adaptive bitwidths. arXiv preprint arXiv:*1912.09666, 2019., during training of AdaBits, the number of bits are progressively reduced, with each bit-width taking 150 epochs.

TABLE 2

Accuracy for the same bit-width for whole network.

| Cifar10 | 4-bit | 3-bit (±4) | 3-bit (±2) | 2-bit |
|---|---|---|---|---|
| Adabits | 91.84 | 79.3 | — | 58.98 |
| $FN^3$-bit | 94.28 | 94.2 | 94.2 | 93.64 |
| Cifar100 | 4-bit | 3-bit (±4) | 3-bit (±2) | 2-bit |
| Adabits | 72.15 | 65.23 | — | 51.67 |
| $FN^3$-bit | 76.65 | 76.34 | 75.35 | 74.97 |

The results of using the same bits for whole network are shown in Table 2. The performance of AdaBits on lower bits drops dramatically, while the performance of $FN^3$-bit only reduces by 0.64% from 4-bit to 2-bit. This validates the idea of composing a nested quantization with multiple step functions in the above embodiment.

In $FN^3$-bit, different bit-widths are applied to 7 groups of layers which leads to 4⁷=16384 sub-networks while AdaBits only provides 3 sub-networks. Thus, with $FN^3$-bit, different layers can use different bit-widths for more flexible deployment to the given resource constraints, which is not possible with AdaBits.

Figures 7A, 7B:
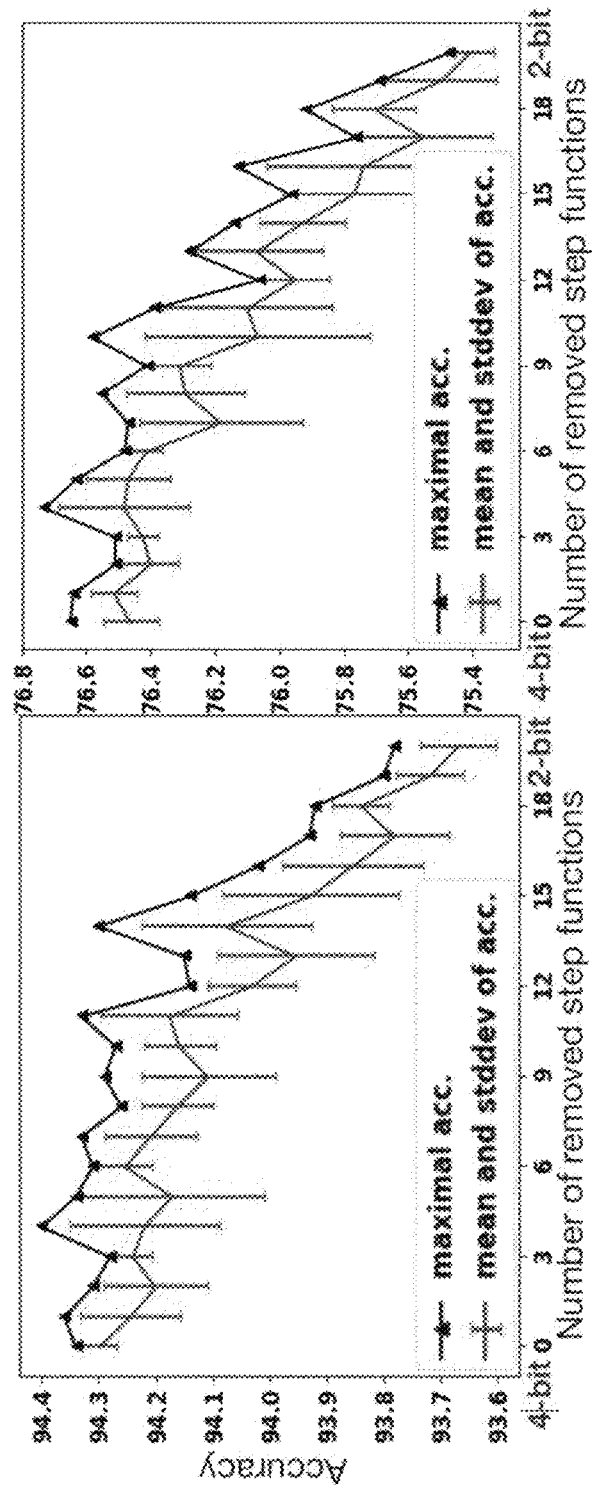
FIG. 7A is a graph showing experiment results (based on a Cifar10 dataset) of performance a neural network with respect to removed step functions (bit related) in one embodiment of the invention.
FIG. 7B is a graph showing experiment results (based on a Cifar100 dataset) of performance a neural network with respect to removed step functions (bit related) in one embodiment of the invention.

FIGS. 7A and 7B shows the results using mixed bit-widths between layers, obtained by running the heuristic search on the model used in above experiment. The x-axis indicates the bit usage, where the left side corresponds to every layer using 4 bits, the right side is every layer using 2 bits, and in between are mixed bit-widths with different number of bits (or step functions) removed. The accuracy with respect to bit-width curve shows that a mixed bit-width can also achieve similar accuracy to using 4-bits for all layers. For example, using around 3 bits (9 step functions removed) has similar performance to using full 4-bits. results show that the above embodiment is widely applicable to compress/quantize a variety of neural network building blocks.

The combination of different levels of blocks (e.g., channel and bits) to generate more adaptive networks is beyond the scope of the present invention.

The above embodiments of the invention has provided a general useful framework for producing a nested neural network, in particular a fully nested neural network that generates large amounts of nested sub-network, based on additive network building blocks. Each sub-network is optimal for a particular resource configuration in terms of prediction accuracy. The framework is able to generate sub-networks for different components/granularities including bits, neurons, channels, residual paths and layers. The heuristic search method embodiments can efficiently find the optimal sub-network. The above embodiments are widely applicable to compress/quantize a variety of neural network building blocks. The neural network can be trained only once, based on the ordered dropout operation embodiments, to achieve its effect. This advantageously reduces consumption of time and resources, compared to some existing methods that require re-training or re-tuning of the same neural network for a different resource configuration. Compared with existing methods such as US-Net, designed only for convolutional channels and AdaBits, designed only for quantization bits, the neural network embodiments of the present invention include various unique advantages. For example the method embodiments are applicable to a wide range of neural network components including bits, neurons, channels, residual paths and layers. The generated nested neural network out-performs US-Net and AdaBits by a large margin in terms of prediction accuracy. The number of generated sub-networks is much greater than that of US-Net and AdaBits. For example, for a neural network with L layers each with B blocks, the number of sub-network of the present invention is $2^{LB}$, while that of US-Net is $2^B$ and that of AdaBits is B. This illustrated that the present invention has more flexibility for deploying a neural network.

Some embodiments of the invention provide an advantageous ordered dropout operation. In summary, ordered dropout is an operation on network weights that forces the weights to be ordered with importance. Specifically, the weights in a layer are first divided into groups based on the required granularity. A group is named a building block. A categorical/geometric distribution is assigned to the indices of groups. During training, in each iteration, an index of group is sampled, after which the groups with index greater than the sampled index are disabled (dropped). Less important weights are dropped with higher probabilities, and vice versa. The categorical/geometric distributions for different layers are independent. Therefore, in each iteration, the sampled indices for different layers are diverse, thus, one particular sub-network is generated and trained. As huge amount of sub-networks are generated and trained in the whole training process, the final network contains sub-networks that are optimal for different resource configurations. The sub-networks are nested as each of them contains smaller sub-networks. Thus, the whole network is fully nested. Some additional or alternative embodiments of the invention provide an advantageous heuristic search algorithm. The neural network trained by ordered dropout contains $2^n$ sub-networks, where n is the number of building blocks. As the number grows exponentially, given a particular resource configuration (e.g., number cores, size of memory), it is extremely hard to find a sub-network that is optimal for it. The heuristic search algorithm is to search for the optimal sub-networks for all resource configurations, with a linear complexity. In summary, a sliding window is adopted which slides from the least important building block to the most. In this process, the algorithm maintains k trajectories including the building blocks to be removed. The subsequent building block to be removed is based on the trajectories. In this way, the complexity becomes linear to the number of building blocks.

The above method embodiments are computer-implemented as they are inextricably linked to computer technologies. The above method embodiments improves on existing neural network architecture, by providing a neural network architecture that is adaptively deployable hence suitable for use across a wide range of machine learning based products and applications.

Figure 8:
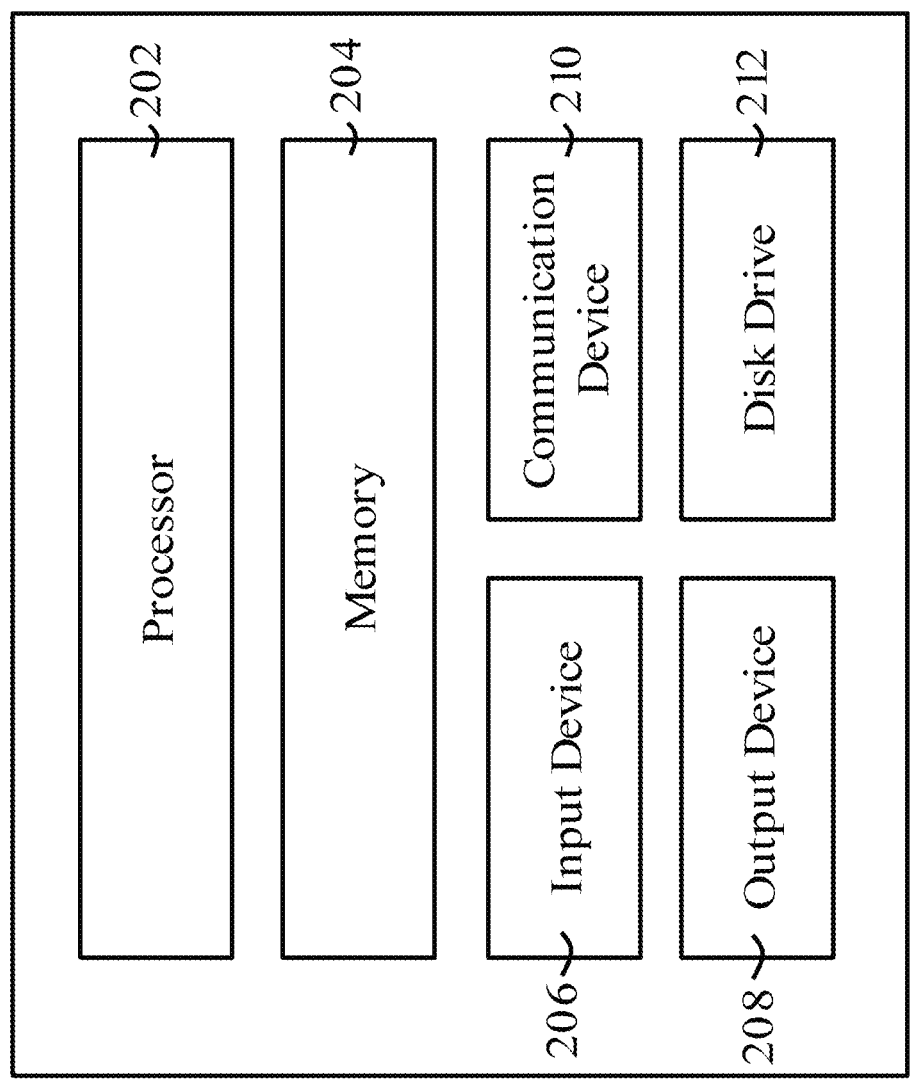
FIG. 8 is a functional block diagram of an information handling system arranged to perform the methods in one or more embodiments of the invention or implement the neural network in one or more embodiments of the invention.

FIG. 8 shows a schematic diagram of exemplary information handling system 200 that can be used as a server or other information processing systems in one embodiment of the invention. The information handling system 200 may be used to implement any one or more method embodiments of the present invention, including those described above and those presented below. Additionally or alternatively, the information handling system 200 may also be the system in which the neural network is initiated, trained, tested, validated, deployed, operated, etc.

The information handling system 200 generally includes suitable components necessary to receive, store, and execute appropriate computer instructions, commands, or codes. The main components of the information handling system 200 are a processor 202 and a memory unit 204. The processor 202 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process data. The memory unit 204 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations. Preferably, the information handling system 200 further includes one or more input devices 206 such as a keyboard, a mouse, a stylus, an image scanner, a microphone, a tactile input device (e.g., touch sensitive screen), and an image/video input device (e.g., camera). The information handling system 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 200 may further include one or more disk drives 212 which may encompass solid state drives, hard disk drives, optical drives, flash drives, and/or magnetic tape drives. A suitable operating system may be installed in the information handling system 200, e.g., on the disk drive 212 or in the memory unit 204. The memory unit 204 and the disk drive 212 may be operated by the processor 202. The information handling system 200 also preferably includes a communication device 210 for establishing one or more communication links (not shown) with one or more other computing devices such as servers, personal computers, terminals, tablets, phones, or other wireless or handheld computing devices. The communication device 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 202, the memory unit 204, and optionally the input devices 206, the output devices 208, the communication device 210 and the disk drives 212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 200 shown in FIG. 8 is merely exemplary and different information handling systems 200 with different configurations, form, size, etc., may be applicable. The information handling system 200 may be at least part of an electrical device, e.g., a desktop computer, a laptop computer, a tablet computer, a smart phone, a smart watch, an IoT device, an autonomous or smart vehicle, video surveillance device, a smart home control device, etc.

Figure 9:
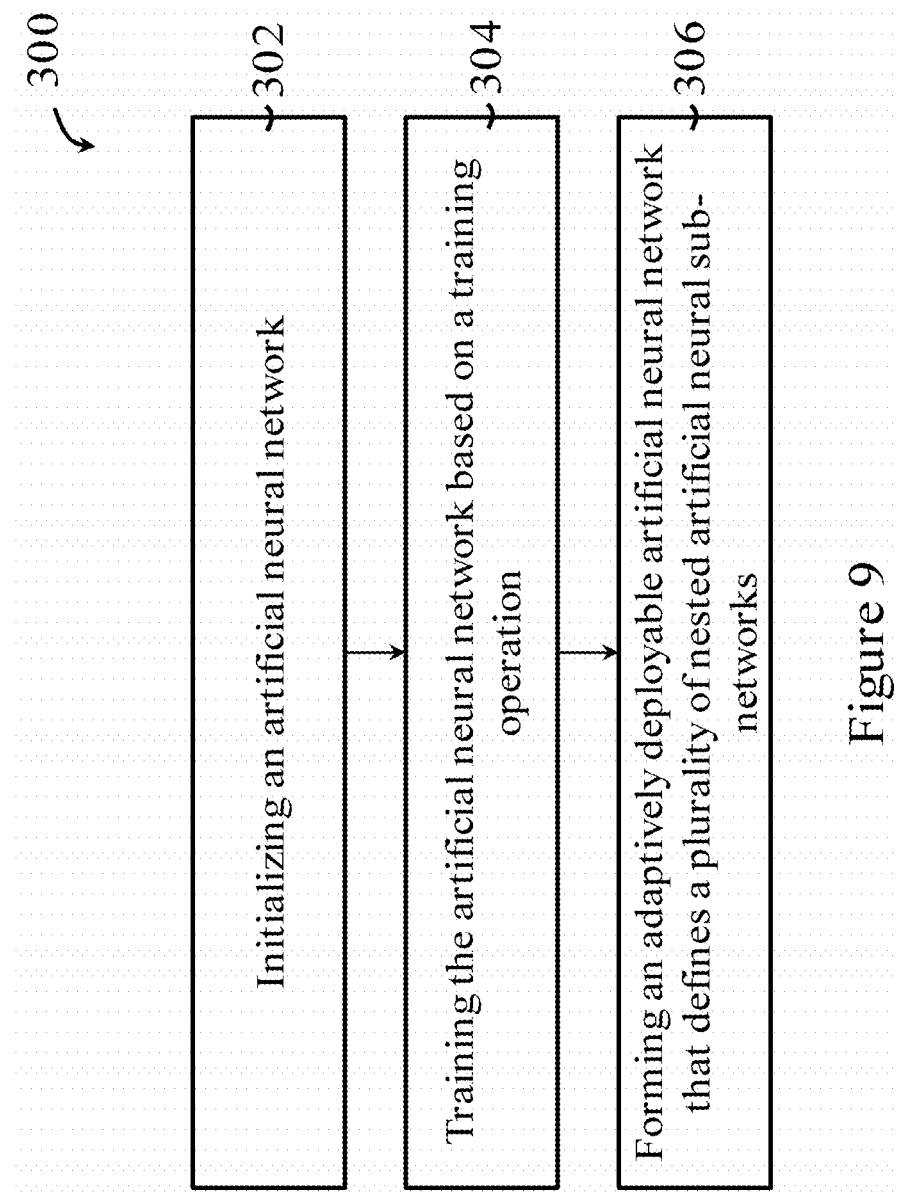
FIG. 9 is a flowchart illustrating a method for configuring a neural network in one embodiment of the invention.

FIG. 9 shows a method 300 for configuring a neural network in one embodiment of the invention. The method 300 is computer-implemented method, which can be implemented using the information handling system 200 in FIG. 8. The neural network in method 300 may be the neural networks presented in the above embodiments.

The method 300 includes, in step 302, initializing an artificial neural network. After the network is initiated, in step 304, the network is trained based on a training operation. The training operation is arranged to train the network to be an adaptively deployable artificial neural network that defines a plurality of nested artificial neural sub-networks each optimal for a respective resource configuration. In step 306, the trained network is formed and can be deployed.

The artificial neural network may include additive building blocks each defined by a respective basis function, arranged in one or more layers. The artificial neural sub-networks are nested in such a way that a smaller artificial neural sub-network forms the basis of a larger artificial neural sub-network. The training method may include the ordered dropout operation presented above.

Figure 10:
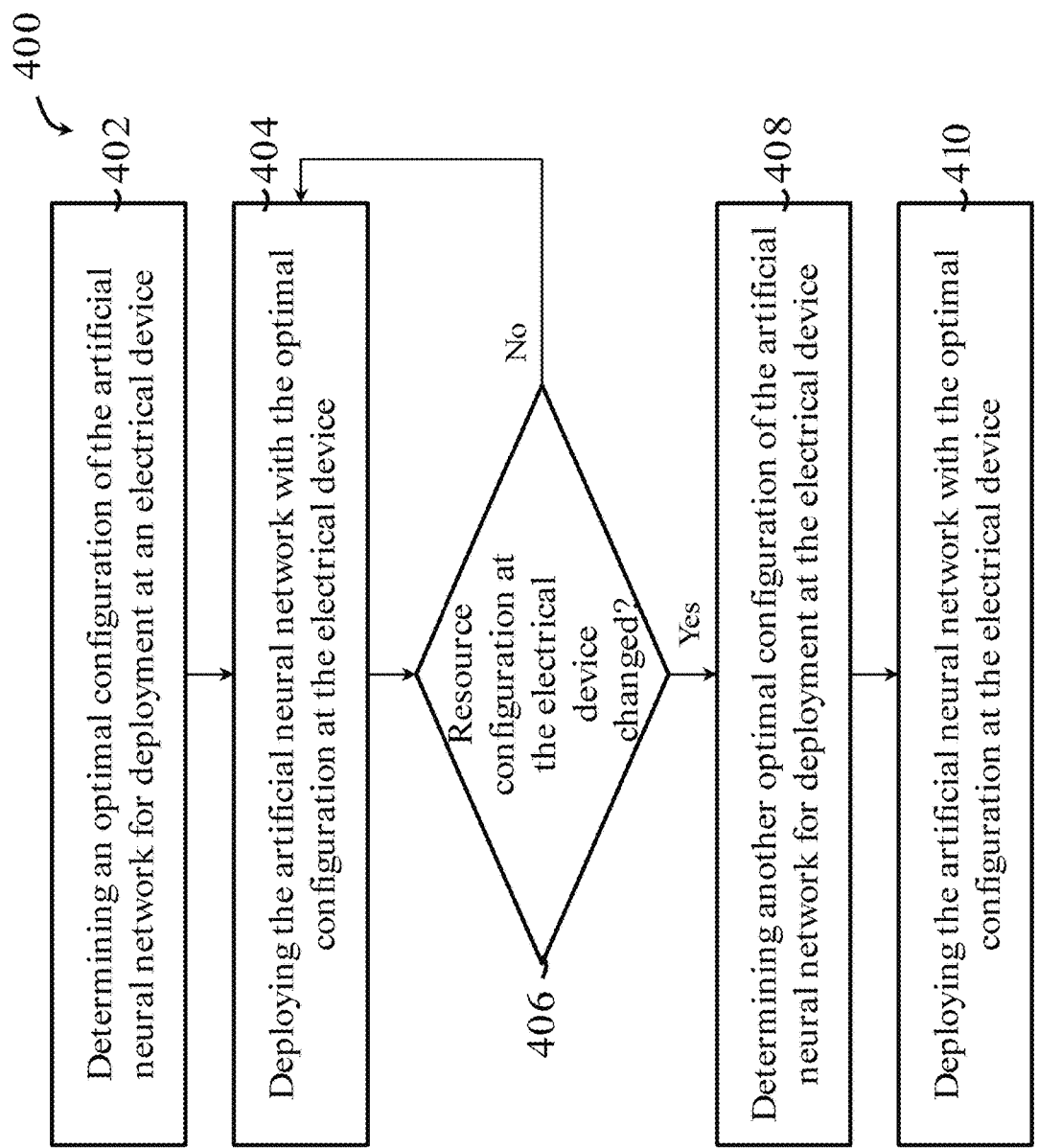
FIG. 10 is a flowchart illustrating a method for implementing a neural network in one embodiment of the invention.

FIG. 10 shows a method 400 for implementing a neural network in one embodiment of the invention. The method 400 is computer-implemented method, which can be implemented using the information handling system 200 in FIG. 8. The neural network in method 400 may be the neural networks presented in the above embodiments, including the neural network configured based obtained from method 300. The neural network is an adaptively deployable artificial neural network that defines a plurality of nested artificial neural sub-networks each optimal for a respective resource configuration. The artificial neural network may include additive building blocks each defined by a respective basis function, arranged in one or more layers.

The method 400 includes, in step 402, determining an optimal configuration of the artificial neural network for deployment at an electrical device with a specific resource configuration. The determination is preferably performed without re-training or re-tuning of the artificial neural network. The determination may include selecting one of the nested artificial neural sub-networks based on the resource configuration of the electrical device, based on a predetermined database with data records that matches different resource configurations to different sub-networks. Alternatively or additionally, the determination may include searching the artificial neural network using a heuristic search algorithm, such as one presented above, to determine components to be removed from the artificial neural network to obtain the optimal configuration.

After the optimal configuration is determined, in step 404, the artificial neural network with the optimal configuration is deployed at the electrical device.

In step 406, the method 400 includes detecting whether resource configuration at the electrical device has changed. The detection may be performed by the electrical device, optionally regularly. The change in resource configuration at the electrical device may be due to due to change of operation mode of the device, change of operation power level of the device, change of operation power source of the device, change of geographical location of the device, change of communication or connectivity of the device, etc.

If no change in resource configuration is detected in step 406, no action is taken. Alternatively, if a change in resource configuration is detected in step 406, the method 400 then proceeds to step 408, to determine another optimal configuration of the artificial neural network for deployment at the electrical device with the new resource configuration. Implementation of step 408 may be similar to or the same as step 402 so the details are not repeated here. After the optimal configuration is determined, in step 410, the artificial neural network with the newly determined optimal configuration is deployed at the electrical device, e.g., replaces the previous configuration which is no longer optimal.

With method 400, in some applications, the neural network in the electrical device can be dynamically reconfigured for improved performance as needed.

Figure 11:
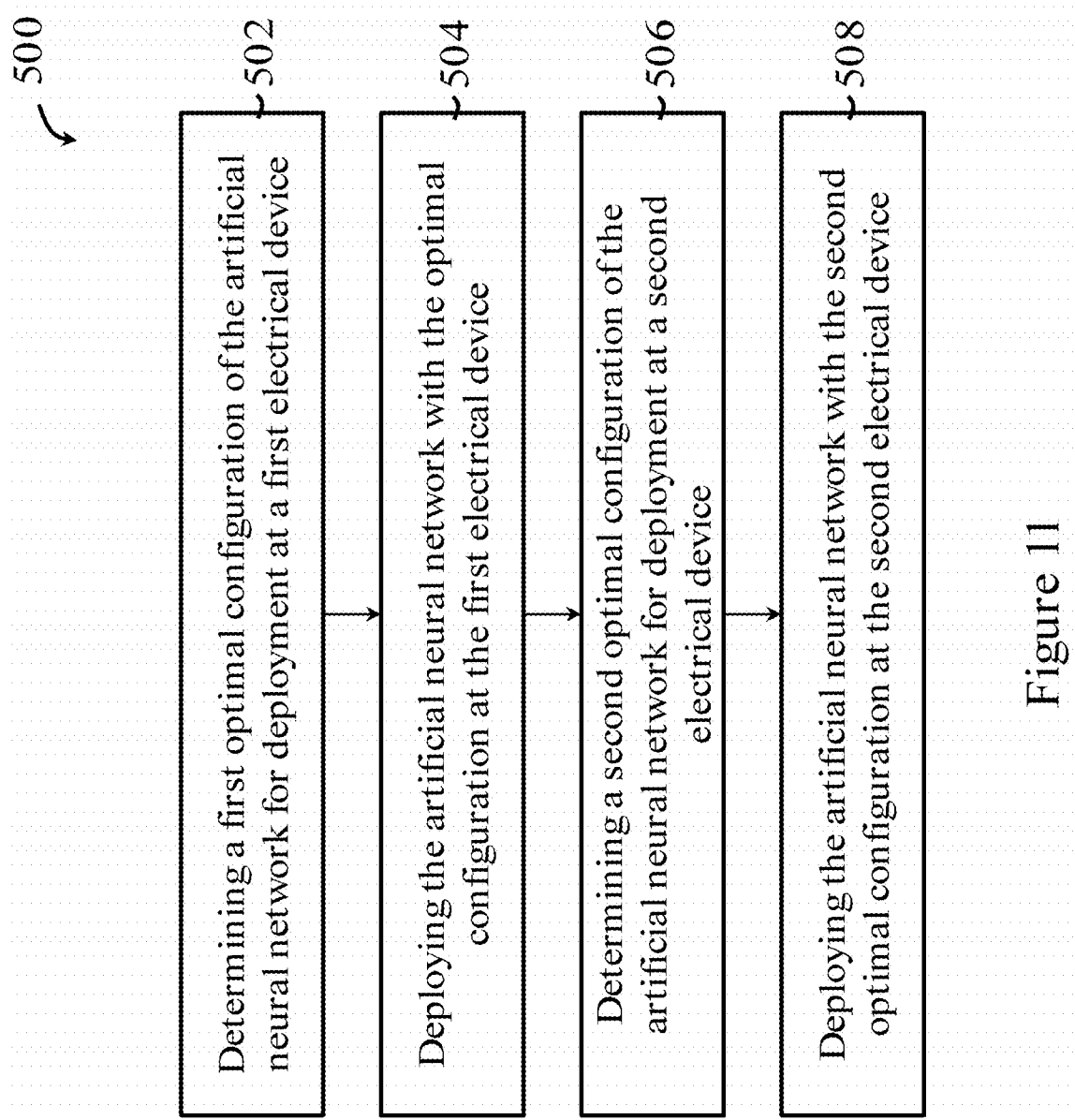
FIG. 11 is a flowchart illustrating a method for implementing a neural network in one embodiment of the invention.

FIG. 11 shows a method 500 for implementing a neural network in one embodiment of the invention. The method 500 is computer-implemented method, which can be implemented using the information handling system 200 in FIG. 8. The neural network in method 500 may be the neural networks presented in the above embodiments, including the neural network configured based obtained from method 300. The neural network is an adaptively deployable artificial neural network that defines a plurality of nested artificial neural sub-networks each optimal for a respective resource configuration.

The method 500 includes, in step 502, determining an optimal configuration of the artificial neural network for deployment at an electrical device with a specific resource configuration. The determination is preferably performed without re-training or re-tuning of the artificial neural network. The determination may include selecting one of the nested artificial neural sub-networks based on the resource configuration of the electrical device, based on a predetermined database with data records that matches different resource configurations to different sub-networks. Alternatively or additionally, the determination may include searching the artificial neural network using a heuristic search algorithm, such as one in the embodiment presented above, to determine components to be removed from the artificial neural network to obtain the optimal configuration.

After the optimal configuration is determined, in step 504, the artificial neural network with the optimal configuration is deployed at the electrical device.

In step 506, the method 500 includes determining an optimal configuration of the artificial neural network for deployment at another electrical device with a different resource configuration. Implementation of step 506 may be similar to or the same as step 502 so the details are not repeated here. After the optimal configuration is determined, in step 508, the artificial neural network with the newly determined optimal configuration is deployed at the other electrical device. In one example, the two electrical devices are of different types of device (e.g., computer vs phone). In another example, the two electrical devices are of the same type but different resource configurations (e.g., different CPU cores, memory sizes, disk sizes, power sources, etc.). While step 506 is shown to be after step 504, in one implementation, steps 506 may be performed before, at the same time, or after step 502, because the determination at the two devices can be independent. In other words, the order of steps in 500 does not matter insofar as step 504 follows step 502 and step 508 follows step 506.

With method 500, in some applications, the same neural network based product or program can be readily deployed to different platforms (e.g., one to a smart phone one to a computer) with satisfactory or optimal performances at these different platforms.

Variations and/or modifications exist for the methods 300, 400, 500. For example, the methods may include additional steps not illustrated. The methods may be implemented on the same device or on different devices, such as the device 200 of FIG. 8.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive.

The invention claimed is:

1. A computer-implemented method of configuring an artificial neural network, comprising:
   initializing an artificial neural network, the artificial neural network comprising a plurality of additive building blocks each defined by a respective basis function, wherein the additive building blocks are residual paths or blocks in ResNeXt, a sum of the outputs of the residual paths or blocks forming an output; and training, based on a training operation, the artificial neural network so as to form an adaptively deployable, fully nested artificial neural network defining a plurality of nested artificial neural sub-networks, each artificial neural sub-network comprising a subset of the plurality of additive building blocks and being optimal for a respective resource configuration;

wherein during the training step, an ordered dropout (ODO) operation is conducted; the ODO operation comprising:

learning the plurality of additive building blocks simultaneously;

assigning each of the building blocks with a respective block index taken from a distribution of block indices;

multiplying an ordered dropout mask with the output of a depth-wise convolution layer in each of the residual blocks;

in each iteration, ranking the building blocks based on a level of importance of the respective building blocks; and dropping a random number of the building blocks;
 selecting a building block or a block index from the distribution of block indices; and
 dropping all building blocks with block indices greater than the selected building block or the selected block index;

the method further comprising: in each said iteration, based on dropped blocks from the ODO operation, removing components from the artificial neural network to obtain an optimal configuration; and generating one said artificial neural sub-network according to the optimal configuration that corresponds to the respective resource configuration.

2. The computer-implemented method of claim 1, wherein the selecting is random.

3. The computer-implemented method of claim 1, wherein the distribution is a categorical distribution or a geometric distribution.

4. A computer-implemented method for implementing an artificial neural network of claim 1, comprising:

determining an optimal configuration of the artificial neural network for deployment at an electrical device, the optimal configuration corresponding to a resource configuration of the electrical device, the artificial neural network being an adaptively deployable artificial neural network that defines a plurality of nested artificial neural sub-networks; and deploying the artificial neural network with the optimal configuration at the electrical device.

5. The computer-implemented method of claim 4, wherein the determining is performed without re-training or re-tuning of the artificial neural network.

6. The computer-implemented method of claim 5, wherein the determining comprises selecting one of the plurality of nested artificial neural sub-networks based on the resource configuration of the electrical device.

7. The computer-implemented method of claim 5, wherein the determining comprises searching the artificial neural network using a heuristic search algorithm to determine the components to be removed from the artificial neural network to obtain the optimal configuration.

8. The computer-implemented method of claim 5, wherein the optimal configuration is the first optimal configuration; and wherein the method further comprises:
 determining a second optimal configuration of the artificial neural network for deployment at the electrical device with a different resource configuration.

9. The computer-implemented method of claim 5, wherein the electrical device is a first electrical device, the optimal configuration is the first optimal configuration; and wherein the method further comprises:
 determining a second optimal configuration of the artificial neural network for deployment at a second electrical device;
 wherein the first and second electrical devices have different resource configurations.

10. The computer-implemented method of claim 9, wherein the determining of the first and second optimal configurations are performed simultaneously.

11. The computer-implemented method of claim 9, wherein the determining of the second optimal configuration is performed without re-training or re-tuning of the artificial neural network.

12. The computer-implemented method of claim 9, wherein the determining of the second optimal configuration comprises selecting one of the plurality of nested artificial neural sub-networks based on resource configuration of second the electrical device.

13. The computer-implemented method of claim 9, wherein the method further comprises:
 deploying the artificial neural network with the second optimal configuration at the second electrical device.

14. A system for implementing an artificial neural network, comprising:
 one or more processors configured to:
  determine an optimal configuration of the artificial neural network for deployment at an electrical device, the artificial neural network being configured according to the method of claim 1; and
  deploy the artificial neural network with the optimal configuration at the electrical device.

15. The computer-implemented method of claim 1, wherein the level of importance indicates an amount of information a building block obtains from input data to the artificial neural network.

16. The computer-implemented method of claim 1, wherein
the initialization step further comprises:
 dividing weights in a layer of the artificial neural network into groups based on a required granularity;
 defining each of the groups as one said building block.

17. The computer-implemented method of claim 1, wherein the training step further comprises conducting multiple ODO operations simultaneously.

18. A system for configuring an artificial neural network, comprising:
 one or more processors; and
 one or more storage devices storing instructions that, when executed by the one or more processors, cause the one or more processors to perform operations comprising:
  initializing an artificial neural network, the artificial neural network comprising a plurality of additive building blocks each defined by a respective basis function;
  wherein the additive building blocks are residual paths or blocks in ResNeXt, a sum of the outputs of the residual paths or blocks forming an output; and
  training, based on a training operation, the artificial neural network so as to form an adaptively deployable, fully nested artificial neural network defining a plurality of nested artificial neural sub-networks, each artificial neural sub-network comprising a subset of the plurality of additive building blocks and being optimal for a respective resource configuration;

wherein during the training operation, an ordered dropout (ODO) operation is conducted; the ODO operation comprising:

learning the plurality of additive building blocks simultaneously;

assigning each of the building blocks with a respective block index taken from a distribution of block indices;

multiplying an ordered dropout mask with the output of a depth-wise convolution layer in each of the residual blocks;

in each iteration, ranking the building blocks based on a level of importance of the respective building blocks; and dropping a random number of the building blocks, which comprises:
  selecting a building block or a block index from the distribution of block indices; and
  dropping all building blocks with block indices greater than the selected building block or the selected block index;

in each said iteration, based on dropped blocks from the ODO operation, removing components from the artificial neural network to obtain an optimal configuration; and generating one said artificial neural sub-network according to the optimal configuration that corresponds to the respective resource configuration.

19. The system of claim 18, wherein the level of importance indicates an amount of information a building block obtains from input data to the artificial neural network.

* * * * *